United States Patent
Zhu et al.

(10) Patent No.: US 9,282,451 B2
(45) Date of Patent: Mar. 8, 2016

(54) AUTOMATIC LOCATION IDENTIFICATION (ALI) SERVICE REQUESTS STEERING, CONNECTION SHARING AND PROTOCOL TRANSLATION

(75) Inventors: Yinjun Zhu, Sammamish, WA (US); Cristine Conner, Seattle, WA (US); Gordon John Hines, Kirkland, WA (US); Hsin-Chih Liao, Mill Creek, WA (US); William Pelligrini, Graham, WA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 1486 days.

(21) Appl. No.: 11/299,911

(22) Filed: Dec. 13, 2005

(65) Prior Publication Data
US 2007/0082650 A1    Apr. 12, 2007

Related U.S. Application Data

(60) Provisional application No. 60/720,044, filed on Sep. 26, 2005.

(51) Int. Cl.
H04M 7/00    (2006.01)
H04W 24/00    (2009.01)
(Continued)

(52) U.S. Cl.
CPC ............... *H04W 8/08* (2013.01); *H04M 7/006* (2013.01); *H04M 2242/04* (2013.01);
(Continued)

(58) Field of Classification Search
USPC .............. 379/229, 230, 45; 455/456.1, 456.3, 455/404.1
See application file for complete search history.

(56) References Cited

U.S. PATENT DOCUMENTS

| 1,103,073 A | 7/1914 | O'Connell |
| 4,445,118 A | 4/1984 | Taylor et al. |

(Continued)

FOREIGN PATENT DOCUMENTS

| WO | WO9921380 | 4/1999 |
| WO | 99/28848 | 12/1999 |

(Continued)

OTHER PUBLICATIONS

Qualcomm CDMA Technologies, LBS Control Plane/User Plane Overview—80-VD378-1NP B, 2006, pp. 1-36.
(Continued)

*Primary Examiner* — William Deane, Jr.
(74) *Attorney, Agent, or Firm* — William H. Bollman

(57) ABSTRACT

An ALI/ESME steering gateway bridges the nationwide ALI/ESME network notes (or PSAPs) with the GMLC/MPCs of various different XPC networks. The steering gateway provides a unified interface between the PSAP/ALI network and positioning centers (GMLC/MPC/VPCs). Using the steering gateway, an E911 service provider accesses positioning centers (GMLC/MPC/VPC) of any XPC network. This access by the ALI to the positioning center is accomplished with any type of interface, irregardless of the protocol type. The connectivity of each virtual communication path between ALIs and PSAPs is managed. The ALI/ESME steering gateway also provides translation of the protocols between the two ALI-MPC interface sets (inbound and outbound). The ALI/ESME steering gateway also consolidates (or "de-duplicates") any/all duplicated requests from a same ALI or PSAP for the same emergency call so that only one request is then sent to the destined positioning center within the relevant network.

23 Claims, 10 Drawing Sheets

ALI Network with ALI/ESME Steering Gateway

(51) Int. Cl.
*H04W 8/08* (2009.01)
*H04W 4/02* (2009.01)
*H04W 88/16* (2009.01)
*H04W 88/18* (2009.01)
*H04W 92/02* (2009.01)

(52) U.S. Cl.
CPC ............ *H04M 2242/30* (2013.01); *H04W 4/02* (2013.01); *H04W 88/16* (2013.01); *H04W 88/18* (2013.01); *H04W 92/02* (2013.01)

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,868,570 A | 9/1989 | Davis |
| 4,891,638 A | 1/1990 | Davis |
| 4,891,650 A | 1/1990 | Scheffer |
| 4,952,928 A | 8/1990 | Carroll |
| 4,972,484 A | 11/1990 | Theile |
| 5,014,206 A | 5/1991 | Scribner |
| 5,043,736 A | 8/1991 | Darnell |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasimaki |
| 5,081,667 A | 1/1992 | Drori |
| 5,119,104 A | 6/1992 | Heller |
| 5,126,722 A | 6/1992 | Kamis |
| 5,144,283 A | 9/1992 | Arens |
| 5,161,180 A | 11/1992 | Chavous |
| 5,166,972 A | 11/1992 | Smith |
| 5,177,478 A | 1/1993 | Wagai |
| 5,193,215 A | 3/1993 | Olmer |
| 5,208,756 A | 5/1993 | Song |
| 5,214,789 A | 5/1993 | George |
| 5,218,367 A | 6/1993 | Sheffer |
| 5,223,844 A | 6/1993 | Mansell |
| 5,239,570 A | 8/1993 | Koster |
| 5,265,630 A | 11/1993 | Hartmann |
| 5,266,944 A | 11/1993 | Carroll |
| 5,283,570 A | 2/1994 | DeLuca |
| 5,289,527 A | 2/1994 | Tiedemann |
| 5,293,642 A | 3/1994 | Lo |
| 5,299,132 A | 3/1994 | Wortham |
| 5,301,354 A | 4/1994 | Schwendeman |
| 5,311,516 A | 5/1994 | Kuznicke |
| 5,325,302 A | 6/1994 | Izidon |
| 5,327,529 A | 7/1994 | Fults |
| 5,334,974 A | 8/1994 | Simms |
| 5,335,246 A | 8/1994 | Yokev |
| 5,343,493 A | 8/1994 | Karimullah |
| 5,347,568 A | 9/1994 | Moody |
| 5,351,235 A | 9/1994 | Lahtinen |
| 5,361,212 A | 11/1994 | Class |
| 5,363,425 A | 11/1994 | Mufti |
| 5,365,451 A | 11/1994 | Wang |
| 5,374,936 A | 12/1994 | Feng |
| 5,379,337 A * | 1/1995 | Castillo et al. .................. 379/45 |
| 5,379,451 A | 1/1995 | Nakagoshi |
| 5,381,338 A | 1/1995 | Wysocki |
| 5,387,993 A | 2/1995 | Heller |
| 5,388,147 A | 2/1995 | Grimes |
| 5,390,339 A | 2/1995 | Bruckery |
| 5,394,158 A | 2/1995 | Chia |
| 5,396,227 A | 3/1995 | Carroll |
| 5,398,190 A | 3/1995 | Wortham |
| 5,406,614 A | 4/1995 | Hara |
| 5,418,537 A | 5/1995 | Bird |
| 5,422,813 A | 6/1995 | Schuchman |
| 5,423,076 A | 6/1995 | Westergren |
| 5,434,789 A | 7/1995 | Fraker |
| 5,454,024 A | 9/1995 | Lebowitz |
| 5,461,390 A | 10/1995 | Hosher |
| 5,470,233 A | 11/1995 | Fruchterman |
| 5,479,408 A | 12/1995 | Will |
| 5,479,482 A | 12/1995 | Grimes |
| 5,485,161 A | 1/1996 | Vaugh |
| 5,485,163 A | 1/1996 | Singer |
| 5,488,563 A | 1/1996 | Chazelle |
| 5,494,091 A | 2/1996 | Freeman |
| 5,497,149 A | 3/1996 | Fast |
| 5,504,491 A | 4/1996 | Chapman |
| 5,506,886 A | 4/1996 | Maine |
| 5,508,931 A | 4/1996 | Snider |
| 5,513,243 A | 4/1996 | Kage |
| 5,515,287 A | 5/1996 | Hakoyama |
| 5,517,199 A | 5/1996 | DiMattei |
| 5,519,403 A | 5/1996 | Bickley |
| 5,530,655 A | 6/1996 | Lokhoff |
| 5,530,914 A | 6/1996 | McPheters |
| 5,532,690 A | 7/1996 | Hertel |
| 5,535,434 A | 7/1996 | Siddoway |
| 5,539,395 A | 7/1996 | Buss |
| 5,539,398 A | 7/1996 | Hall |
| 5,539,829 A | 7/1996 | Lokhoff |
| 5,543,776 A | 8/1996 | L'Esperance |
| 5,546,445 A | 8/1996 | Dennison |
| 5,552,772 A | 9/1996 | Janky |
| 5,555,286 A | 9/1996 | Tendler |
| 5,568,119 A | 10/1996 | Schipper |
| 5,568,153 A | 10/1996 | Beliveau |
| 5,574,648 A | 11/1996 | Pilley |
| 5,579,372 A | 11/1996 | Angstrom |
| 5,588,009 A | 12/1996 | Will |
| 5,592,535 A | 1/1997 | Klotz |
| 5,594,780 A | 1/1997 | Wiedeman |
| 5,604,486 A | 2/1997 | Lauro |
| 5,606,313 A | 2/1997 | Allen |
| 5,606,618 A | 2/1997 | Lokhoff |
| 5,606,850 A | 3/1997 | Nakamura |
| 5,610,815 A | 3/1997 | Gudat |
| 5,614,890 A | 3/1997 | Fox |
| 5,615,116 A | 3/1997 | Gudat |
| 5,621,793 A | 4/1997 | Bednarek |
| 5,628,051 A | 5/1997 | Salin |
| 5,629,693 A | 5/1997 | Janky |
| 5,633,912 A | 5/1997 | Tsoi |
| 5,636,276 A | 6/1997 | Brugger |
| 5,661,652 A | 8/1997 | Sprague |
| 5,661,755 A | 8/1997 | Van de Kerkhof |
| 5,682,600 A | 10/1997 | Salin |
| 5,689,245 A | 11/1997 | Noreen |
| 5,699,053 A | 12/1997 | Jonsson |
| 5,704,029 A | 12/1997 | Wright, Jr. |
| 5,717,688 A | 2/1998 | Belanger et al. |
| 5,721,781 A | 2/1998 | Deo |
| 5,731,785 A | 3/1998 | Lemelson |
| 5,740,534 A | 4/1998 | Ayerst |
| 5,761,618 A | 6/1998 | Lynch |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston |
| 5,774,533 A | 6/1998 | Patel |
| 5,774,670 A | 6/1998 | Montulli |
| 5,787,357 A | 7/1998 | Salin |
| 5,794,142 A | 8/1998 | Vantilla |
| 5,797,094 A | 8/1998 | Houde |
| 5,797,096 A | 8/1998 | Lupien |
| 5,802,492 A | 9/1998 | DeLorrme |
| 5,806,000 A | 9/1998 | Vo |
| 5,809,415 A | 9/1998 | Rossmann |
| 5,812,086 A | 9/1998 | Bertiger |
| 5,812,087 A | 9/1998 | Krasner |
| 5,822,700 A | 10/1998 | Hult |
| 5,828,740 A | 10/1998 | Khue |
| 5,835,907 A | 11/1998 | Newman |
| 5,841,396 A | 11/1998 | Krasner |
| 5,857,201 A | 1/1999 | Wright, Jr. |
| 5,864,667 A | 1/1999 | Barkam |
| 5,874,914 A | 2/1999 | Krasner |
| 5,896,369 A | 4/1999 | Warsta |

(56) References Cited

U.S. PATENT DOCUMENTS

| | | | |
|---|---|---|---|
| 5,920,821 | A | 7/1999 | Seaholtz |
| 5,922,074 | A | 7/1999 | Richard |
| 5,930,250 | A | 7/1999 | Klok |
| 5,930,701 | A | 7/1999 | Skog |
| 5,943,399 | A | 8/1999 | Bannister |
| 5,945,944 | A | 8/1999 | Krasner |
| 5,946,629 | A | 8/1999 | Sawyer |
| 5,946,630 | A | 8/1999 | Willars |
| 5,950,130 | A | 9/1999 | Coursey |
| 5,950,137 | A | 9/1999 | Kim |
| 5,953,398 | A | 9/1999 | Hill |
| 5,960,362 | A | 9/1999 | Grob |
| 5,974,054 | A | 10/1999 | Couts |
| 5,978,685 | A | 11/1999 | Laiho |
| 5,983,099 | A | 11/1999 | Yao |
| 5,987,323 | A | 11/1999 | Huotari |
| 5,998,111 | A | 12/1999 | Abe |
| 5,999,124 | A | 12/1999 | Sheynblat |
| 6,014,602 | A | 1/2000 | Kithol |
| 6,032,051 | A | 2/2000 | Hall |
| 6,035,025 | A | 3/2000 | Hanson |
| 6,049,710 | A | 4/2000 | Nilsson |
| 6,052,081 | A | 4/2000 | Krasner |
| 6,058,300 | A | 5/2000 | Hanson |
| 6,058,338 | A | 5/2000 | Agashe et al. |
| 6,061,018 | A | 5/2000 | Sheynblat |
| 6,061,346 | A | 5/2000 | Nordman |
| 6,064,336 | A | 5/2000 | Krasner |
| 6,064,875 | A | 5/2000 | Morgan |
| 6,067,045 | A | 5/2000 | Castelloe |
| 6,070,067 | A | 5/2000 | Nguyen |
| 6,075,982 | A | 6/2000 | Donovan |
| 6,081,229 | A | 6/2000 | Soliman |
| 6,081,508 | A | 6/2000 | West |
| 6,085,320 | A | 7/2000 | Kaliski, Jr. |
| 6,101,240 | A * | 8/2000 | Blair et al. ............... 379/45 |
| 6,101,378 | A | 8/2000 | Barabash |
| 6,101,428 | A | 8/2000 | Snyder |
| 6,104,931 | A | 8/2000 | Havinis |
| 6,108,533 | A | 8/2000 | Brohoff |
| 6,122,503 | A | 9/2000 | Daly |
| 6,122,520 | A | 9/2000 | Want |
| 6,124,810 | A | 9/2000 | Segal |
| 6,128,664 | A | 10/2000 | Yanagidate et al. |
| 6,131,067 | A | 10/2000 | Girerd |
| 6,133,874 | A | 10/2000 | Krasner |
| 6,134,316 | A | 10/2000 | Kallioniemi |
| 6,134,483 | A | 10/2000 | Vayanos |
| 6,138,003 | A | 10/2000 | Kingdon |
| 6,148,197 | A | 11/2000 | Bridges |
| 6,148,198 | A | 11/2000 | Anderson |
| 6,149,353 | A | 11/2000 | Nilsson |
| 6,150,980 | A | 11/2000 | Krasner |
| 6,154,172 | A | 11/2000 | Piccionelli |
| 6,169,891 | B1 | 1/2001 | Gorham |
| 6,169,901 | B1 | 1/2001 | Boucher |
| 6,169,902 | B1 | 1/2001 | Kawamoto |
| 6,173,181 | B1 | 1/2001 | Losh |
| 6,178,505 | B1 | 1/2001 | Schneider |
| 6,178,506 | B1 | 1/2001 | Quick, Jr. |
| 6,181,935 | B1 | 1/2001 | Gossman |
| 6,181,939 | B1 | 1/2001 | Ahvenainen |
| 6,188,354 | B1 | 2/2001 | Soliman |
| 6,188,752 | B1 | 2/2001 | Lesley |
| 6,188,909 | B1 | 2/2001 | Alananra |
| 6,189,098 | B1 | 2/2001 | Kaliski, Jr. |
| 6,195,557 | B1 | 2/2001 | Havinis |
| 6,198,431 | B1 | 3/2001 | Gibson |
| 6,199,045 | B1 | 3/2001 | Giniger |
| 6,199,113 | B1 | 3/2001 | Alegre |
| 6,205,330 | B1 | 3/2001 | Windbladh |
| 6,208,290 | B1 | 3/2001 | Krasner |
| 6,208,854 | B1 | 3/2001 | Roberts |
| 6,215,441 | B1 | 4/2001 | Moeglein |
| 6,219,557 | B1 | 4/2001 | Havinis |
| 6,223,046 | B1 | 4/2001 | Hamill-Keays |
| 6,226,529 | B1 | 5/2001 | Bruno |
| 6,239,742 | B1 | 5/2001 | Krasner |
| 6,247,135 | B1 | 6/2001 | Feague |
| 6,249,680 | B1 | 6/2001 | Wax |
| 6,249,744 | B1 | 6/2001 | Morita |
| 6,249,873 | B1 | 6/2001 | Richard |
| 6,253,074 | B1 | 6/2001 | Carlsson |
| 6,253,203 | B1 | 6/2001 | O'Flaherty |
| 6,256,489 | B1 * | 7/2001 | Lichter et al. ............... 455/404.2 |
| 6,260,147 | B1 | 7/2001 | Quick, Jr. |
| 6,266,614 | B1 | 7/2001 | Alumbaugh |
| 6,275,692 | B1 | 8/2001 | Skog |
| 6,275,849 | B1 | 8/2001 | Ludwig |
| 6,278,701 | B1 | 8/2001 | Ayyagari |
| 6,289,373 | B1 | 9/2001 | Dezonno |
| 6,297,768 | B1 | 10/2001 | Allen, Jr. |
| 6,307,504 | B1 | 10/2001 | Sheynblat |
| 6,308,269 | B2 | 10/2001 | Proidl |
| 6,313,786 | B1 | 11/2001 | Sheynblat |
| 6,317,594 | B1 | 11/2001 | Gossman |
| 6,321,091 | B1 | 11/2001 | Holland |
| 6,321,092 | B1 | 11/2001 | Fitch |
| 6,321,257 | B1 | 11/2001 | Kotala |
| 6,324,542 | B1 | 11/2001 | Wright, Jr. et al. |
| 6,327,473 | B1 | 12/2001 | Soliman |
| 6,327,479 | B1 | 12/2001 | Mikkola |
| 6,330,454 | B1 | 12/2001 | Verdonk |
| 6,333,919 | B2 | 12/2001 | Gaffney |
| 6,360,093 | B1 | 3/2002 | Ross |
| 6,360,102 | B1 | 3/2002 | Havinis |
| 6,363,254 | B1 | 3/2002 | Jones |
| 6,367,019 | B1 | 4/2002 | Ansell |
| 6,370,389 | B1 | 4/2002 | Isomursu |
| 6,377,209 | B1 | 4/2002 | Krasner |
| 6,377,810 | B1 | 4/2002 | Geiger |
| 6,400,314 | B1 | 6/2002 | Krasner |
| 6,400,958 | B1 | 6/2002 | Isomursu |
| 6,411,254 | B1 | 6/2002 | Moeglein |
| 6,421,002 | B2 | 7/2002 | Krasner |
| 6,427,001 | B1 | 7/2002 | Contractor |
| 6,433,734 | B1 | 8/2002 | Krasner |
| 6,434,381 | B1 | 8/2002 | Moore |
| 6,442,391 | B1 | 8/2002 | Johansson |
| 6,449,473 | B1 | 9/2002 | Raivisto |
| 6,449,476 | B1 | 9/2002 | Hutchison, IV |
| 6,456,852 | B2 | 9/2002 | Bar |
| 6,463,272 | B1 | 10/2002 | Wallace |
| 6,477,150 | B1 | 11/2002 | Maggenti |
| 6,504,491 | B1 | 1/2003 | Christians |
| 6,505,049 | B1 | 1/2003 | Dorenbosch |
| 6,510,387 | B2 | 1/2003 | Fuchs |
| 6,512,922 | B1 | 1/2003 | Burg |
| 6,512,930 | B2 | 1/2003 | Sandegren |
| 6,515,623 | B2 | 2/2003 | Johnson |
| 6,519,464 | B1 | 2/2003 | Santhoff |
| 6,519,466 | B2 | 2/2003 | Pande |
| 6,522,682 | B1 | 2/2003 | Kohli |
| 6,526,026 | B1 | 2/2003 | Menon |
| 6,529,490 | B1 | 3/2003 | Oh et al. |
| 6,529,500 | B1 | 3/2003 | Pandharipande |
| 6,529,722 | B1 | 3/2003 | Heinrich |
| 6,529,829 | B2 | 3/2003 | Turetzky |
| 6,531,982 | B1 | 3/2003 | White |
| 6,538,757 | B1 | 3/2003 | Sansone |
| 6,539,200 | B1 | 3/2003 | Schiff |
| 6,539,232 | B2 | 3/2003 | Hendrey et al. |
| 6,539,304 | B1 | 3/2003 | Chansarkar |
| 6,542,464 | B1 | 4/2003 | Takeda |
| 6,542,734 | B1 | 4/2003 | Abrol |
| 6,542,743 | B1 | 4/2003 | Soliman |
| 6,549,522 | B1 | 4/2003 | Flynn |
| 6,549,776 | B1 | 4/2003 | Joong |
| 6,549,844 | B1 | 4/2003 | Egberts |
| 6,553,236 | B1 | 4/2003 | Dunko |
| 6,556,832 | B1 | 4/2003 | Soliman |
| 6,560,461 | B1 | 5/2003 | Fomukong |
| 6,560,534 | B2 | 5/2003 | Abraham |
| 6,564,261 | B1 | 5/2003 | Gudjonsson |

(56) References Cited

U.S. PATENT DOCUMENTS

| | | |
|---|---|---|
| 6,570,530 B2 | 5/2003 | Gaal |
| 6,571,095 B1 | 5/2003 | Koodli |
| 6,574,558 B2 | 6/2003 | Kohli |
| 6,580,390 B1 | 6/2003 | Hay |
| 6,584,307 B1 | 6/2003 | Antonucci |
| 6,584,552 B1 | 6/2003 | Kuno et al. |
| 6,587,691 B1 | 7/2003 | Granstam |
| 6,594,500 B2 | 7/2003 | Bender |
| 6,597,311 B2 | 7/2003 | Sheynblat |
| 6,600,927 B2 | 7/2003 | Hamilton |
| 6,603,973 B1 | 8/2003 | Foladare |
| 6,606,495 B1 | 8/2003 | Korpi |
| 6,606,554 B2 | 8/2003 | Edge |
| 6,609,004 B1 | 8/2003 | Morse |
| 6,611,757 B2 | 8/2003 | Brodie |
| 6,618,593 B1 | 9/2003 | Drutman |
| 6,618,670 B1 | 9/2003 | Chansarkar |
| 6,621,452 B2 | 9/2003 | Knockeart |
| 6,621,810 B1 | 9/2003 | Leung |
| 6,628,233 B2 | 9/2003 | Knockeart |
| 6,633,255 B2 | 10/2003 | Krasner |
| 6,640,184 B1 | 10/2003 | Rabe |
| 6,650,288 B1 | 11/2003 | Pitt |
| 6,650,901 B1 | 11/2003 | Shuster |
| 6,661,372 B1 | 12/2003 | Girerd |
| 6,665,539 B2 | 12/2003 | Sih |
| 6,665,541 B1 | 12/2003 | Krasner |
| 6,671,620 B1 | 12/2003 | Garin |
| 6,677,894 B2 | 1/2004 | Sheynblat |
| 6,678,357 B2 | 1/2004 | Stumer |
| 6,680,694 B1 | 1/2004 | Knockeart |
| 6,680,695 B2 | 1/2004 | Turetzky |
| 6,687,504 B1 | 2/2004 | Raith |
| 6,691,019 B2 | 2/2004 | Seeley |
| 6,694,258 B2 | 2/2004 | Johnson |
| 6,697,629 B1 | 2/2004 | Grilli |
| 6,698,195 B1 | 3/2004 | Hellinger |
| 6,701,144 B2 | 3/2004 | Kirbas |
| 6,703,971 B2 | 3/2004 | Pande |
| 6,703,972 B2 | 3/2004 | Van Diggelen |
| 6,704,651 B2 | 3/2004 | Van Diggelen |
| 6,707,421 B1 | 3/2004 | Drury |
| 6,714,793 B1 | 3/2004 | Carey |
| 6,718,174 B2 | 4/2004 | Vayanos |
| 6,721,578 B2 | 4/2004 | Minear |
| 6,721,871 B2 | 4/2004 | Piispanen |
| 6,724,342 B2 | 4/2004 | Bloebaum |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | Van Diggelen |
| 6,738,013 B2 | 5/2004 | Orler |
| 6,738,800 B1 | 5/2004 | Aquilon |
| 6,741,842 B2 | 5/2004 | Goldberg |
| 6,744,856 B2 | 6/2004 | Karnik |
| 6,744,858 B1 | 6/2004 | Ryan |
| 6,744,859 B1 * | 6/2004 | Koepke .................. H04M 3/51 379/265.01 |
| 6,745,038 B2 | 6/2004 | Callaway, Jr. |
| 6,747,596 B2 | 6/2004 | Orler |
| 6,748,195 B1 | 6/2004 | Phillips |
| 6,751,464 B1 | 6/2004 | Burg |
| 6,756,938 B2 | 6/2004 | Zhao |
| 6,757,266 B1 | 6/2004 | Hundscheidt |
| 6,757,544 B2 | 6/2004 | Rangarajan |
| 6,757,545 B2 | 6/2004 | Nowak |
| 6,771,742 B2 | 8/2004 | McCalmont et al. |
| 6,771,971 B2 | 8/2004 | Smith |
| 6,772,340 B1 | 8/2004 | Peinado |
| 6,775,267 B1 | 8/2004 | Kung |
| 6,775,534 B2 | 8/2004 | Lindgren |
| 6,775,655 B1 | 8/2004 | Peinado |
| 6,775,802 B2 | 8/2004 | Gaal |
| 6,778,136 B2 | 8/2004 | Gronemeyer |
| 6,778,885 B2 | 8/2004 | Agashe |
| 6,781,963 B2 | 8/2004 | Crockett |
| 6,788,249 B1 | 9/2004 | Farmer |
| 6,795,444 B1 | 9/2004 | Vo |
| 6,795,699 B1 | 9/2004 | McGraw |
| 6,799,049 B1 | 9/2004 | Zellner |
| 6,799,050 B1 | 9/2004 | Krasner |
| 6,801,159 B2 | 10/2004 | Swope |
| 6,804,524 B1 | 10/2004 | Vandermaijden |
| 6,807,534 B1 | 10/2004 | Erickson |
| 6,810,323 B1 | 10/2004 | Bullock |
| 6,813,264 B2 | 11/2004 | Vassilovski |
| 6,813,560 B2 | 11/2004 | Van Diggelen |
| 6,816,111 B2 | 11/2004 | Krasner |
| 6,816,710 B2 | 11/2004 | Krasner |
| 6,816,719 B1 | 11/2004 | Heinonen et al. |
| 6,816,734 B2 | 11/2004 | Wong et al. |
| 6,820,269 B2 | 11/2004 | Baucke et al. |
| 6,829,475 B1 | 12/2004 | Lee |
| 6,832,373 B2 | 12/2004 | O'Neill |
| 6,839,020 B2 | 1/2005 | Geier |
| 6,839,021 B2 | 1/2005 | Sheynblat |
| 6,839,417 B2 | 1/2005 | Weisman |
| 6,842,715 B1 | 1/2005 | Gaal |
| 6,847,618 B2 | 1/2005 | Laursen |
| 6,847,822 B1 | 1/2005 | Dennison |
| 6,853,916 B2 | 2/2005 | Fuchs |
| 6,856,282 B2 | 2/2005 | Mauro |
| 6,861,980 B1 | 3/2005 | Rowitch |
| 6,865,171 B1 | 3/2005 | Nilsson |
| 6,865,395 B2 | 3/2005 | Riley |
| 6,867,733 B2 | 3/2005 | Sandhu |
| 6,867,734 B2 | 3/2005 | Voor |
| 6,873,854 B2 | 3/2005 | Crockett |
| 6,876,734 B1 | 4/2005 | Summers |
| 6,882,850 B2 | 4/2005 | McConnell et al. |
| 6,885,874 B2 | 4/2005 | Grube |
| 6,885,940 B2 | 4/2005 | Brodie |
| 6,888,497 B2 | 5/2005 | King |
| 6,888,932 B2 | 5/2005 | Snip |
| 6,895,238 B2 | 5/2005 | Newell |
| 6,895,249 B2 | 5/2005 | Gaal |
| 6,898,633 B1 | 5/2005 | Lyndersay |
| 6,900,758 B1 | 5/2005 | Mann |
| 6,903,684 B1 | 6/2005 | Simic |
| 6,904,029 B2 | 6/2005 | Fors |
| 6,907,224 B2 | 6/2005 | Younis |
| 6,907,238 B2 | 6/2005 | Leung |
| 6,912,230 B1 | 6/2005 | Salkini |
| 6,912,395 B2 | 6/2005 | Benes |
| 6,912,545 B1 | 6/2005 | Lundy et al. |
| 6,915,208 B2 | 7/2005 | Garin |
| 6,917,331 B2 | 7/2005 | Gronemeyer |
| 6,922,565 B2 * | 7/2005 | Rhodes et al. ............. 455/456.1 |
| 6,930,634 B2 | 8/2005 | Peng |
| 6,937,187 B2 | 8/2005 | Van Diggelen |
| 6,937,597 B1 | 8/2005 | Rosenberg |
| 6,937,872 B2 | 8/2005 | Krasner |
| 6,940,826 B1 | 9/2005 | Simard |
| 6,940,950 B2 | 9/2005 | Dickinson |
| 6,941,144 B2 | 9/2005 | Stein |
| 6,944,540 B2 | 9/2005 | King |
| 6,947,772 B2 | 9/2005 | Minear |
| 6,950,058 B1 | 9/2005 | Davis |
| 6,957,068 B2 | 10/2005 | Hutchison |
| 6,957,073 B2 | 10/2005 | Bye |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti |
| 6,968,044 B2 | 11/2005 | Beason |
| 6,970,917 B1 | 11/2005 | Kushwaha |
| 6,973,320 B2 | 12/2005 | Brown |
| 6,975,266 B2 | 12/2005 | Abraham |
| 6,978,453 B2 | 12/2005 | Rao |
| 6,980,816 B2 | 12/2005 | Rohler |
| 6,985,747 B2 | 1/2006 | Chithambaram |
| 6,993,355 B1 | 1/2006 | Pershan |
| 6,996,720 B1 | 2/2006 | DeMello |
| 6,999,782 B2 | 2/2006 | Shaughnessy |

(56) References Cited

U.S. PATENT DOCUMENTS

| | | | |
|---|---|---|---|
| 7,024,321 | B1 | 4/2006 | Deninger |
| 7,024,393 | B1 | 4/2006 | Peinado |
| 7,047,411 | B1 | 5/2006 | DeMello |
| 7,065,351 | B2 | 6/2006 | Carter |
| 7,065,507 | B2 | 6/2006 | Mohammed |
| 7,072,667 | B2 | 7/2006 | Olrik |
| 7,079,857 | B2 | 7/2006 | Maggenti |
| 7,092,385 | B2 | 8/2006 | Gallant |
| 7,103,018 | B1 | 9/2006 | Hansen |
| 7,103,574 | B1 | 9/2006 | Peinado |
| 7,106,717 | B2 | 9/2006 | Rousseau |
| 7,110,773 | B1 | 9/2006 | Wallace |
| 7,136,466 | B1 | 11/2006 | Gao |
| 7,136,838 | B1 | 11/2006 | Peinado |
| 7,151,946 | B2 | 12/2006 | Maggenti |
| 7,174,153 | B2 | 2/2007 | Ehlers |
| 7,177,397 | B2* | 2/2007 | McCalmont et al. ............ 379/45 |
| 7,177,398 | B2 | 2/2007 | Meer |
| 7,177,399 | B2* | 2/2007 | Dawson et al. ................. 379/45 |
| 7,184,418 | B1 | 2/2007 | Baba |
| 7,200,380 | B2 | 4/2007 | Havlark |
| 7,209,758 | B1 | 4/2007 | Moll |
| 7,209,969 | B2 | 4/2007 | Lahti |
| 7,218,940 | B2 | 5/2007 | Niemenma |
| 7,221,959 | B2 | 5/2007 | Lindquist |
| 7,245,900 | B1 | 7/2007 | Lamb |
| 7,246,187 | B1 | 7/2007 | Ezra |
| 7,260,186 | B2 | 8/2007 | Zhu |
| 7,260,384 | B2 | 8/2007 | Bales et al. |
| 7,269,428 | B1 | 9/2007 | Wallenius |
| 7,302,582 | B2 | 11/2007 | Snapp |
| 7,321,773 | B2 | 1/2008 | Hines |
| 7,330,899 | B2 | 2/2008 | Wong |
| 7,333,480 | B1 | 2/2008 | Clarke |
| 7,369,508 | B2 | 5/2008 | Parantainen |
| 7,369,530 | B2 | 5/2008 | Keagy |
| 7,382,773 | B2 | 6/2008 | Schoeneberger |
| 7,392,240 | B2 | 6/2008 | Scriffignano |
| 7,394,896 | B2 | 7/2008 | Norton |
| 7,412,049 | B1 | 8/2008 | Koch |
| 7,424,293 | B2 | 9/2008 | Zhu |
| 7,426,380 | B2 | 9/2008 | Hines |
| 7,428,571 | B2 | 9/2008 | Ichimura |
| 7,436,785 | B1 | 10/2008 | McMullen |
| 7,440,442 | B2 | 10/2008 | Grabelsky |
| 7,450,951 | B2 | 11/2008 | Vimpari |
| 7,453,990 | B2 | 11/2008 | Welenson |
| 7,495,608 | B1 | 2/2009 | Chen |
| 7,522,581 | B2 | 4/2009 | Acharya |
| 7,573,982 | B2 | 8/2009 | Breen |
| 7,602,886 | B1 | 10/2009 | Beech |
| 7,623,447 | B1 | 11/2009 | Faccin |
| 7,702,081 | B1 | 4/2010 | Klesper |
| 7,711,094 | B1 | 5/2010 | Olshansky |
| 7,715,821 | B2 | 5/2010 | Rollender |
| 7,747,258 | B2 | 6/2010 | Farmer |
| 7,764,961 | B2 | 7/2010 | Zhu |
| 7,783,297 | B2 | 8/2010 | Ishii |
| 7,787,611 | B1 | 8/2010 | Kotelly |
| 7,792,989 | B2 | 9/2010 | Toebes |
| 7,881,233 | B2 | 2/2011 | Bieselin |
| 7,890,122 | B2 | 2/2011 | Walsh |
| 7,895,263 | B1 | 2/2011 | Kirchmeier |
| 7,937,067 | B2 | 5/2011 | Maier |
| 8,005,683 | B2 | 8/2011 | Tessesl |
| 8,027,658 | B2 | 9/2011 | Suryanarayana |
| 8,041,335 | B2 | 10/2011 | Khetawat |
| RE42,927 | E | 11/2011 | Want |
| 8,060,389 | B2 | 11/2011 | Johnson |
| 8,308,570 | B2 | 11/2012 | Fiedler |
| 8,660,573 | B2* | 2/2014 | Zhu .................. H04W 4/02 455/453 |
| 8,682,281 | B2 | 3/2014 | Dunn |
| 8,787,867 | B2 | 7/2014 | Bleckert |
| 2001/0011247 | A1 | 8/2001 | O'Flaherty |
| 2001/0040886 | A1 | 11/2001 | Jimenez |
| 2002/0037735 | A1 | 3/2002 | Maggenti |
| 2002/0042260 | A1 | 4/2002 | Saucedo et al. |
| 2002/0052214 | A1 | 5/2002 | Maggenti |
| 2002/0061760 | A1 | 5/2002 | Maggenti |
| 2002/0069529 | A1 | 6/2002 | Wieres |
| 2002/0077083 | A1 | 6/2002 | Zellner |
| 2002/0077084 | A1 | 6/2002 | Zellner |
| 2002/0077118 | A1 | 6/2002 | Zellner |
| 2002/0077897 | A1 | 6/2002 | Zellner |
| 2002/0085538 | A1 | 7/2002 | Leung |
| 2002/0086659 | A1 | 7/2002 | Lauper |
| 2002/0086676 | A1 | 7/2002 | Hendrey |
| 2002/0098832 | A1 | 7/2002 | Fleischer |
| 2002/0102996 | A1 | 8/2002 | Jenkins |
| 2002/0111172 | A1 | 8/2002 | DeWolf |
| 2002/0112047 | A1 | 8/2002 | Kushwaha |
| 2002/0118650 | A1 | 8/2002 | Jagadeesan |
| 2002/0123327 | A1 | 9/2002 | Vataja |
| 2002/0126656 | A1 | 9/2002 | Park |
| 2002/0138650 | A1 | 9/2002 | Yamamoto |
| 2002/0158777 | A1 | 10/2002 | Flick |
| 2002/0173317 | A1 | 11/2002 | Nykanen |
| 2002/0191595 | A1 | 12/2002 | Mar |
| 2002/0197991 | A1 | 12/2002 | Anvekar et al. |
| 2003/0009277 | A1 | 1/2003 | Fan |
| 2003/0009602 | A1 | 1/2003 | Jacobs |
| 2003/0012148 | A1 | 1/2003 | Peters |
| 2003/0013449 | A1 | 1/2003 | Hose |
| 2003/0016804 | A1 | 1/2003 | Sheha et al. |
| 2003/0026245 | A1 | 2/2003 | Ejzak |
| 2003/0037163 | A1 | 2/2003 | Kitada |
| 2003/0040272 | A1 | 2/2003 | Lelievre |
| 2003/0065788 | A1 | 4/2003 | Salimaki |
| 2003/0072318 | A1 | 4/2003 | Lam |
| 2003/0078064 | A1 | 4/2003 | Chan |
| 2003/0081557 | A1 | 5/2003 | Mettala |
| 2003/0086539 | A1 | 5/2003 | McCalmont |
| 2003/0101329 | A1 | 5/2003 | Lahti |
| 2003/0103484 | A1 | 6/2003 | Oommen |
| 2003/0104341 | A1 | 6/2003 | Zavitsanos |
| 2003/0108176 | A1 | 6/2003 | Kung |
| 2003/0109245 | A1 | 6/2003 | McCalmont |
| 2003/0114157 | A1 | 6/2003 | Spitz |
| 2003/0115328 | A1 | 6/2003 | Salminen |
| 2003/0119521 | A1 | 6/2003 | Tipnis |
| 2003/0119528 | A1 | 6/2003 | Pew |
| 2003/0137961 | A1 | 7/2003 | Tsirtsis et al. |
| 2003/0153340 | A1 | 8/2003 | Crockett |
| 2003/0153341 | A1 | 8/2003 | Crockett |
| 2003/0153342 | A1 | 8/2003 | Crockett |
| 2003/0153343 | A1 | 8/2003 | Crockett |
| 2003/0161298 | A1 | 8/2003 | Bergman |
| 2003/0186709 | A1 | 10/2003 | Rhodes |
| 2003/0196105 | A1 | 10/2003 | Fineberg |
| 2003/0204640 | A1 | 10/2003 | Sahinoja |
| 2003/0223381 | A1 | 12/2003 | Schroderus |
| 2004/0002326 | A1 | 1/2004 | Maher |
| 2004/0032485 | A1 | 2/2004 | Stephens |
| 2004/0043775 | A1* | 3/2004 | Kennedy et al. ............ 455/456.2 |
| 2004/0047461 | A1 | 3/2004 | Weisman |
| 2004/0068724 | A1 | 4/2004 | Gardner |
| 2004/0076277 | A1 | 4/2004 | Kuusinen |
| 2004/0098497 | A1* | 5/2004 | Banet et al. .................... 709/230 |
| 2004/0132465 | A1 | 7/2004 | Mattila |
| 2004/0143852 | A1 | 7/2004 | Meyers |
| 2004/0146040 | A1 | 7/2004 | Phan-Anh |
| 2004/0181689 | A1 | 9/2004 | Kiyoto |
| 2004/0184584 | A1 | 9/2004 | McCalmont |
| 2004/0185875 | A1 | 9/2004 | Diacakis |
| 2004/0190497 | A1 | 9/2004 | Know |
| 2004/0192271 | A1 | 9/2004 | Eisner |
| 2004/0198332 | A1 | 10/2004 | Lundsgaard |
| 2004/0198386 | A1 | 10/2004 | Dupray |
| 2004/0205151 | A1 | 10/2004 | Sprigg |
| 2004/0229632 | A1 | 11/2004 | Flynn |
| 2004/0242238 | A1 | 12/2004 | Wang |
| 2004/0267445 | A1 | 12/2004 | De Luca |
| 2005/0020242 | A1 | 1/2005 | Holland |

(56) References Cited

U.S. PATENT DOCUMENTS

| | | |
|---|---|---|
| 2005/0028034 A1 | 2/2005 | Gantman |
| 2005/0039178 A1 | 2/2005 | Marolia |
| 2005/0041578 A1 | 2/2005 | Huotari |
| 2005/0043037 A1 | 2/2005 | Loppe |
| 2005/0043038 A1 | 2/2005 | Maanoja |
| 2005/0053209 A1* | 3/2005 | D'Evelyn et al. ............ 379/111 |
| 2005/0063519 A1 | 3/2005 | James |
| 2005/0078612 A1 | 4/2005 | Lang |
| 2005/0083911 A1 | 4/2005 | Grabelsky |
| 2005/0086467 A1 | 4/2005 | Asokan |
| 2005/0090236 A1 | 4/2005 | Schwinke |
| 2005/0101335 A1 | 5/2005 | Kelly |
| 2005/0107673 A1 | 5/2005 | Ball |
| 2005/0112030 A1 | 5/2005 | Gaus |
| 2005/0119012 A1 | 6/2005 | Merheb |
| 2005/0134504 A1 | 6/2005 | Harwood |
| 2005/0135569 A1 | 6/2005 | Dickinson |
| 2005/0136885 A1 | 6/2005 | Kaltsukis |
| 2005/0169248 A1 | 8/2005 | Truesdale |
| 2005/0174991 A1* | 8/2005 | Keagy ........................ 370/352 |
| 2005/0190892 A1* | 9/2005 | Dawson et al. ............... 379/37 |
| 2005/0192822 A1 | 9/2005 | Hartenstein |
| 2005/0201358 A1 | 9/2005 | Nelson |
| 2005/0201528 A1 | 9/2005 | Meer |
| 2005/0201529 A1* | 9/2005 | Nelson et al. .................. 379/45 |
| 2005/0209995 A1 | 9/2005 | Aksu |
| 2005/0213716 A1 | 9/2005 | Zhu |
| 2005/0232252 A1 | 10/2005 | Hoover |
| 2005/0255857 A1 | 11/2005 | Kim |
| 2005/0259675 A1 | 11/2005 | Tuohino |
| 2005/0265318 A1 | 12/2005 | Khartabil |
| 2005/0271029 A1 | 12/2005 | Iffland |
| 2005/0282518 A1 | 12/2005 | D'Evelyn |
| 2005/0287979 A1 | 12/2005 | Rollender |
| 2005/0289097 A1 | 12/2005 | Trossen |
| 2006/0008065 A1 | 1/2006 | Longman et al. |
| 2006/0023747 A1 | 2/2006 | Koren et al. |
| 2006/0026288 A1 | 2/2006 | Acharya |
| 2006/0053225 A1 | 3/2006 | Poikselka |
| 2006/0068753 A1 | 3/2006 | Karpen |
| 2006/0077911 A1 | 4/2006 | Shaffer |
| 2006/0078094 A1 | 4/2006 | Breen |
| 2006/0079236 A1* | 4/2006 | Del Pino et al. ............ 455/445 |
| 2006/0079330 A1 | 4/2006 | Dvorak |
| 2006/0088152 A1 | 4/2006 | Green |
| 2006/0104306 A1 | 5/2006 | Adamczyk |
| 2006/0120517 A1 | 6/2006 | Moon |
| 2006/0128395 A1 | 6/2006 | Muhonen |
| 2006/0135177 A1 | 6/2006 | Winterbottom |
| 2006/0154710 A1 | 7/2006 | Serafat |
| 2006/0188083 A1 | 8/2006 | Breen |
| 2006/0189303 A1* | 8/2006 | Rollender .................... 455/417 |
| 2006/0193447 A1 | 8/2006 | Schwartz |
| 2006/0212558 A1 | 9/2006 | Sahinoja |
| 2006/0212562 A1 | 9/2006 | Kushwaha |
| 2006/0224752 A1 | 10/2006 | Parekh |
| 2006/0234639 A1 | 10/2006 | Kushwaha |
| 2006/0234698 A1 | 10/2006 | Fok |
| 2006/0239205 A1 | 10/2006 | Warren |
| 2006/0250987 A1 | 11/2006 | White |
| 2006/0258380 A1 | 11/2006 | Liebowitz |
| 2006/0281437 A1 | 12/2006 | Cook |
| 2006/0293024 A1 | 12/2006 | Benco |
| 2006/0293066 A1 | 12/2006 | Edge |
| 2007/0003024 A1* | 1/2007 | Olivier et al. ................. 379/45 |
| 2007/0019614 A1 | 1/2007 | Hoffmann |
| 2007/0022011 A1 | 1/2007 | Altberg |
| 2007/0026854 A1 | 2/2007 | Nath |
| 2007/0026871 A1 | 2/2007 | Wager |
| 2007/0027997 A1 | 2/2007 | Polk |
| 2007/0036139 A1 | 2/2007 | Patel |
| 2007/0041513 A1 | 2/2007 | Gende |
| 2007/0049288 A1 | 3/2007 | Lamprecht |
| 2007/0054676 A1 | 3/2007 | Duan |
| 2007/0060097 A1 | 3/2007 | Edge |
| 2007/0081635 A1 | 4/2007 | Croak |
| 2007/0115941 A1 | 5/2007 | Patel |
| 2007/0121601 A1 | 5/2007 | Kikinis |
| 2007/0149166 A1 | 6/2007 | Turcotte |
| 2007/0149213 A1 | 6/2007 | Lamba |
| 2007/0160036 A1 | 7/2007 | Smith |
| 2007/0162228 A1 | 7/2007 | Mitchell |
| 2007/0201623 A1 | 8/2007 | Hines |
| 2007/0206568 A1 | 9/2007 | Silver |
| 2007/0206613 A1 | 9/2007 | Silver |
| 2007/0242660 A1 | 10/2007 | Xu |
| 2007/0253429 A1 | 11/2007 | James |
| 2007/0254625 A1 | 11/2007 | Edge |
| 2007/0263610 A1 | 11/2007 | Mitchell |
| 2007/0270162 A1* | 11/2007 | Hampel et al. ............. 455/456.1 |
| 2007/0270164 A1 | 11/2007 | Maier |
| 2007/0291733 A1 | 12/2007 | Doran |
| 2008/0032703 A1 | 2/2008 | Krumm |
| 2008/0037715 A1 | 2/2008 | Prozeniuk |
| 2008/0045250 A1 | 2/2008 | Hwang |
| 2008/0059304 A1 | 3/2008 | Kimsey |
| 2008/0063153 A1 | 3/2008 | Krivorot |
| 2008/0065775 A1 | 3/2008 | Polk |
| 2008/0081646 A1* | 4/2008 | Morin et al. .................. 455/466 |
| 2008/0117859 A1 | 5/2008 | Shahidi |
| 2008/0146343 A1 | 6/2008 | Sullivan et al. |
| 2008/0162637 A1 | 7/2008 | Adamczyk |
| 2008/0176582 A1 | 7/2008 | Ghai |
| 2008/0186164 A1 | 8/2008 | Emigh |
| 2008/0200182 A1 | 8/2008 | Shim |
| 2008/0214202 A1 | 9/2008 | Toomey |
| 2009/0003535 A1 | 1/2009 | Grabelsky |
| 2009/0067417 A1 | 3/2009 | Kalavade |
| 2009/0097450 A1 | 4/2009 | Wallis |
| 2009/0128404 A1 | 5/2009 | Martino |
| 2009/0215466 A1 | 8/2009 | Ahl et al. |
| 2009/0323636 A1 | 12/2009 | Dillon |
| 2010/0003976 A1 | 1/2010 | Zhu |
| 2010/0054220 A1 | 3/2010 | Bischinger et al. |
| 2010/0062788 A1 | 3/2010 | Nagorniak |
| 2010/0067444 A1 | 3/2010 | Faccin |
| 2010/0069034 A1 | 3/2010 | Dickinson |
| 2010/0119049 A1 | 5/2010 | Clark |
| 2010/0167760 A1 | 7/2010 | Kim |
| 2010/0172482 A1 | 7/2010 | Fotta |
| 2010/0178973 A1 | 7/2010 | Snoddy et al. |
| 2010/0188992 A1 | 7/2010 | Raleigh |
| 2010/0198933 A1 | 8/2010 | Smith |
| 2010/0218664 A1 | 9/2010 | Toledano et al. |
| 2010/0223222 A1 | 9/2010 | Zhou et al. |
| 2010/0273445 A1 | 10/2010 | Dunn |
| 2011/0113060 A1 | 5/2011 | Martini |
| 2011/0273568 A1 | 11/2011 | Lagassey |
| 2012/0001750 A1 | 1/2012 | Monroe |
| 2012/0052832 A1 | 3/2012 | Bleckert |
| 2012/0189107 A1 | 7/2012 | Dickinson |
| 2013/0012232 A1 | 1/2013 | Titus |
| 2013/0072308 A1 | 3/2013 | Peck et al. |
| 2013/0079152 A1 | 3/2013 | Hall |
| 2013/0303196 A1* | 11/2013 | Mitchell .................... 455/456.3 |

FOREIGN PATENT DOCUMENTS

| | | |
|---|---|---|
| WO | 9928848 | 6/2000 |
| WO | WO01/45342 | 6/2001 |
| WO | WO02/11407 | 7/2001 |
| WO | 01/46666 | 11/2001 |
| WO | 0146666 | 7/2002 |
| WO | WO2004/025941 | 3/2004 |
| WO | WO2005/051033 | 6/2005 |
| WO | WO 2005/051033 | 6/2005 |
| WO | WO2007027166 | 3/2007 |

OTHER PUBLICATIONS

Bhalla et al, TELUS, Technology Strategy—LBS Roaming Summit, Sep. 19, 2006.
Alfredo Aguirre, Ilusacell, First and Only Carrier in Mexico with a 3G CDMA Network, 2007.

(56) References Cited

OTHER PUBLICATIONS

Mike McMullen, Sprint, LBS Roaming Summit, Sep. 19, 2006.
Andrew Yeow, BCE, LBS Roaming Summit, Sep. 19, 2006, pp. 1-8.
Nars Haran, U.S. Cellular, Packet Data—Roaming and LBS Overview, Nov. 2, 2007, pp. 1-15.
Qualcomm CDMA Technologies, LBS Control Plane Roaming—80-VD377-1NP A, 2006, pp. 1-10.
Qualcomm CDMA Technologies, MS Resident User Plane LBS Roaming—80-VC718-1 E, 2006, pp. 1-37.
$3^{rd}$ Generation Partnership Project 2, Position Determination Service Standard for Dual Mode SpreadSpectrum Systems, Feb. 16, 2001, pp. i-X, 1-1-1-5, 2-1-2-2, 3-1-3-51, 4-1-4-66, A-1-A-2, B-1-B-2, C-1-C-2, D-1-D-2.
Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.
International Search Report in PCT/US2007/23243 dated Apr. 2, 2008.
Yilin Ahao, Efficient and reliable date transmission for cellular and GPS based mayday systems, Nov. 1997, IEEE, IEEE Conference on Intelligent Transportation System, 1997. ITSC 97, 555-559.
Examiner's Office Letter in Japanese Patent Application No. 2006-542691 dated Sep. 7, 2009.
JP Laid-Open Gazette No. 2004-158947 (English abstract only).
JP Laid-Open Gazette No. 2007-507123 (counterpart English text U.S. Pat. No. 2007/0054676).

T. Hattori, "Wireless Broadband Textbook," IDG Japan, Jun. 10, 2002, pp. 142-143. (no English text).
Intrado Inc., Qwest Detailed SR/ALI to MPC/GMLC Interface Specification for TCP/IP Implementation of TIA/EIA/J-STD-036 E2 with Phase I Location Description Addition, Intrado Informed Response; Apr. 2004; Issue 1.11; pp. 1-57.
Extended European Search Report from EPO in European Appl. No. 06827172.5 dated Dec. 29, 2009.
Intrado MSAG Prep for E911 Program and Documentation. Intrado Inc., Longmont, CO. Sep. 14, 2006. Accessed: Nov. 8, 2011. Idaho PSAP Standards Committee. Idaho Emergency Communications Commission, http://idahodispatch.com/index.php?option=com_documan&task=doc_download&gid=3&Itemid=7.
Location Based Services V2 Roaming Support (non proprietary), 80-V8470-2NP A, dated Jan. 27, 2005, pp. 1-56.
International Search Report received in PCT/US2011/02001 dated Apr. 27, 2012.
International Search Report received in PCT/US2011/000100 dated Apr. 24, 2012.
International Search Report received in PCT/US2011/001990 dated Apr. 24, 2012.
Schulzrinne et al., Emergency Services for Internet Telephony Systems draft-schulzrinne-sipping-emergency-arch, IETF Standard Working Draft, Feb. 4, 2004, 1-22.
International Search Report received in PCT/US11/01971 dated Feb. 28, 2013.

* cited by examiner

ALI Network with ALI/ESME Steering Gateway

Current ALI Network Interface Steering Types

| Inbound \ Outbound | PAM e.g. PAM (v 6.1) (311) | Legacy NENA (e.g. NENA 02 or 04) (312) | E2 SR/ALI(e.g. NENA 05, JSTD 036 Redundant Node Primary/Secondary configuration) (313) | E2/ALISA(e.g. NENA 05 Full redundant node configuration) (314) | OMA MLP(e.g. European 112) (315) | Ve2(e.g. VoIP E2 redundant node primary secondary configuration) (316) |
|---|---|---|---|---|---|---|
| PAM(e.g. PAM v 6.1 (301) | applicable | applicable | applicable | applicable | applicable | applicable |
| Legacy NENA (e.g. NENA 02 or 04) (302) | applicable | applicable | applicable | applicable | applicable | applicable |
| E2 SR/ALI (e.g. NENA 05, JSTD 036 Redundant Node Primary/Secondary configuration) (303) | applicable | applicable | applicable | applicable | applicable | applicable |

FIG. 3A
(PRIOR ART)

| E2 ALISA (e.g. NENA 05 Full redundant node configuration) (304) | applicable | applicable | applicable | | | |
|---|---|---|---|---|---|---|
| OMA MLP (e.g. European 112) (305) | applicable | applicable | applicable | applicable | applicable | applicable |
| Ve2 (e.g. VoIP E2 redundant node primary secondary configuration) (306) | applicable | applicable | applicable | applicable | applicable | applicable |

FIG. 3B
(PRIOR ART)

Exemplary Call Flow E2 ALI with Selective Router Addition (ALISA) (Fully Connected Redundant Node, Both Mode) to selective router with ALI (SR/ALI) -E2+ Steering

AUTOMATIC LOCATION IDENTIFICATION (ALI) SERVICE REQUESTS STEERING, CONNECTION SHARING AND PROTOCOL TRANSLATION

The present application claims priority from U.S. Provisional Patent Application No. 60/720,044, filed Sep. 26, 2005, entitled "Automatic Location Identification (ALI) Service Requests Steering and Connection Sharing" to Zhu et al., the entirety of which is expressly incorporated herein by reference.

BACKGROUND OF THE INVENTION

1. Field of the Invention

This invention relates generally to wireless telecommunication. More particularly, it relates to the delivery of location information to PSAP/ALI systems in a non-landline environment i.e. cellular, VoIP etc in an emergency services call flow.

2. Background of Related Art 9-1-1 is a phone number widely recognized in North America as an emergency phone number that is used to contact emergency dispatch personnel. Enhanced 9-1-1 (E9-1-1) is defined by the transmission of callback number and location information when 9-1-1 is used. E9-1-1 may be implemented for landline, cellular or VoIP networks. A Public Service Answering Point (PSAP) is a dispatch office that receives 9-1-1 calls from the public. A PSAP may be a local, fire or police department, an ambulance service or a regional office covering all services.

Regardless of the network type, a 9-1-1 service becomes E-9-1-1 when automatic number identification and automatic location information related to the call is provided to the 9-1-1 operator at the PSAP. A primary challenge results from the fact that calls may arrive at the PSAP without callback number or location information displayed at the emergency operators terminal.

A PSAP is connected to one Automatic Location Identifier (ALI). An ALI is a database that accepts a PSAP query with telephone number, relates the telephone number to an address and provides that address (location information) back to the PSAP in a manner that works for the customer premise equipment (CPE) display. An ALI is typically owned by a LEC or a PSAP, and may be regional (i.e. connected to many PSAPs) or standalone (i.e. connected to only one PSAP). There is no one single standard interface protocol for PSAP-ALI connection/communication.

Most PSAPs are publicly funded and maintain only one outside ALI connection for both landline and non-landline networks. Some ALIs are able to support only one outside connection to a positioning center. This is problematic for non-landline networks, which have users who are inherently mobile and may be in a particular PSAP-ALI jurisdiction, but their provider does not maintain a connection to the PSAP/ALI.

FIG. 7 shows a conventional landline public safety access point (PSAP) to automatic location identifier (ALI) connection.

In particular, upon receiving a 9-1-1 call, the PSAP queries their ALI for location data. As shown in FIG. 7 in landline telephony, an ALI 401 accepts a PSAP 400 query for location and returns location based on pre-provisioned data for the telephone number.

FIG. 8 shows a context diagram for a conventional non-landline XPC network.

In particular, as shown in FIG. 8 in non-landline telephony, PSAPs 400a, 400b query the same ALI 401a, 401b for location information. However, the ALI 401a, 401b is not pre-provisioned with location data for non-landline calls (e.g. cellular, VoIP etc) and must communicate with other network entities to obtain and deliver location data to the PSAP 400a, 400b.

Non-landline telephony standards (e.g. cellular, VoIP etc) have mandated that ALIs 401, 401a, 401b maintain connectivity to positioning centers 402a, 402b, 402c that are able to provide current location data for a non-landline call. In the current state of technology the positioning center 402 provides the caller's location and the callback number to the ALI, which passes it to the requesting PSAP. As can be seen in FIG. 8, an ALI may maintain connectivity to more than one positioning center via an multiple interface types 403a, 403b, 403c, . . . , etc.—both standard and non-standard (e.g. NENA ESP, PAM, E2+etc).

As used herein, the generic term "XPC" refers interchangeably to any standards-based positioning center.

A positioning center 402 may be any one of the following types used in non-landline networks:

GMLC (Gateway Mobile Location Center): The positioning center that retrieves, forwards, stores and controls emergency position data within the GSM location network.

MPC (Mobile Position Center): The positioning center that retrieves, forwards, stores and controls emergency position data within the ANSI location network.

VPC (VoIP Positioning Center): The positioning center which retrieves, forwards, stores and controls emergency position data within the VoIP location network.

The term "XPC network" is used herein when appropriate to refer to any non-landline network where a positioning center 402 responds to ALI 401a, 401b queries for location i.e. cellular, VoIP etc.

The term "PSAP" refers herein to either a public safety access point (PSAP), or to an Emergency Call Center (ECC), a VoIP term.

There is no uniformity among the thousands of different PSAPs with regard to how they request location data delivery (e.g. there are many different protocol interfaces), or as to how that data displayed on the PSAP customer premise equipment (CPE) varies, because the technology for connecting calls varies between the many manufacturers of, and carriers using, ALI devices. Moreover, some PSAPs are not enhanced, and thus do not receive the callback or location information at all from any phone, be it landline, cellular or VoIP.

Multiple implementations of ALI-XPC interface types are possible. Conventional ALI networks are overly complex because ALI networks nationwide must support multiple and varied ALI-XPC interfaces with different configurations.

Each carrier selects a single XPC to provide location data for its callers—not all XPCs have connectivity with all the ESME/ALI servers associated with the corresponding PSAPs that may be requesting location. Conventional XPCs for a non-landline service provider are required to handle many aspects in the emergency services call flow—from routing an emergency E9-1-1 call to the relevant PSAP; to providing ALI information to the PSAP. This creates a highly complex architecture.

There is a need for an architecture and methodology that both simplifies the complexity of the national PSAP and/or ALI network, and which also increases system efficiencies by reducing required system elements.

SUMMARY OF THE INVENTION

In accordance with the principles of the invention, a new E9-1-1 element called an "ALI/ESME Steering Gateway" is introduced. The concept of ALI/ESME Steering Gateway 100 is illustrated in FIG. 1. The "ALI/ESME Steering Gateway" 100 appears as an XPC to the ALI/ESME requesting location data delivery; and as an ESME/ALI to the XPC that possesses the location information for the caller.

ALI/ESME Steering Gateway addresses the complexity of supporting various ALI-XPC interfaces with different configurations and interface protocols; and the fact that not every carrier's XPC has connectivity with all the ESME/ALI servers associated with the corresponding PSAPs. ALI/ESME Steering Gateway provides nationwide connectivity between XPCs and regional and standalone ALI (SALI) databases through a single contact point. ALI/ESME Steering Gateway takes over the burden from the XPC of delivering ALI information to the PSAP via whatever technology or interface protocol the PSAP's ALI requires.

ALI/ESME Steering Gateway provides the following added functionality to the non-landline network:
  Manages the connectivity for each individual ALI-XPC interface, freeing the each from having to maintain multiple connections;
  Provides protocol translation between ALI-XPC interface sets (inbound and outbound), freeing each from having to support multiple interface protocols;
  Consolidates (de-duplicates) duplicated requests from the same PSAP for the same emergency call: sending only one request if required to the XPC In accordance with the principles of the present invention, an ALI/ESME Steering Gateway comprises a plurality of protocol agents for communicating with respective ALI systems each having a different communication protocols for communicating with an XPC. An inbound ALI interface to ALI/ESME Steering Gateway connects each of the plurality of protocol agents to the respective ALI systems. An outbound ALI interface to ALI/ESME Steering Gateway connects each of the plurality of protocol agents to respective XPCs (positioning centers).

A method of translating and properly formatting automatic location identification (ALI) requests of one type interface protocol to an XPC of another type interface protocol in accordance with another aspect of the invention comprises receiving an ALI request of an inbound ALI interface using a first type interface protocol. The ALI request is converted into a second type interface protocol different from the first type. The converted ALI request is transmitted over an outbound ALI interface using the second type interface protocol, wherein an ALI request of one type IP protocol is able to access an MPC using a different type IP protocol.

BRIEF DESCRIPTION OF THE DRAWINGS

Features and advantages of the present invention will become apparent to those skilled in the art from the following description with reference to the drawings, in which:

FIGS. 3A through 3B are a table showing possible ALI-MPC interface steering types, in accordance with an exemplary embodiment of the present invention.

DETAILED DESCRIPTION OF ILLUSTRATIVE EMBODIMENTS

The present invention provides connectivity, protocol translation and data delivery between PSAP/ALI systems and XPCs. The method and mechanism described and shown is referred to herein as "ALI/ESME Steering Gateway".

Figure 1:
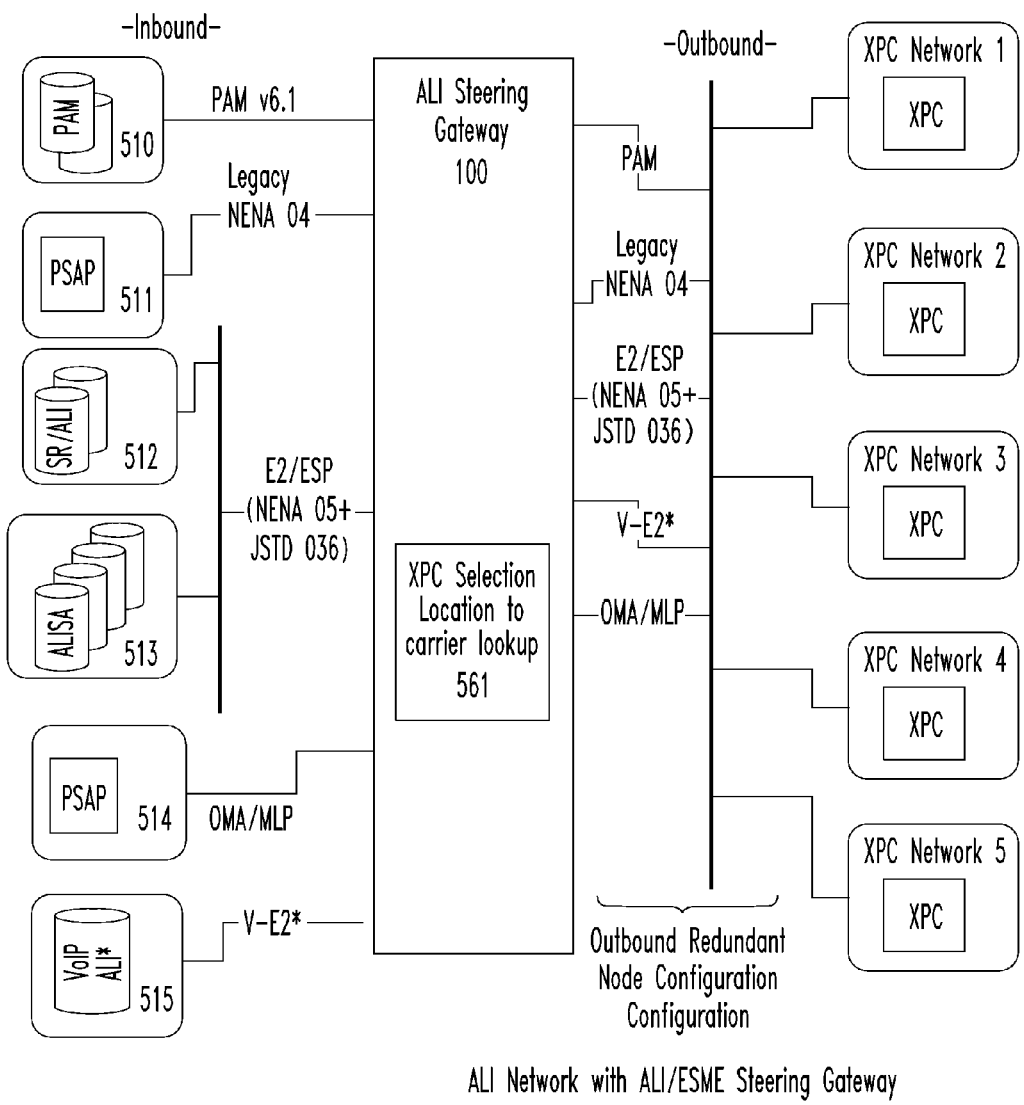
FIG. 1 shows an exemplary ALI network including an ALI/ESME Steering Gateway, in accordance with the principles of the present invention.

FIG. 1 shows an exemplary ALI network including an ALI/ESME Steering Gateway 100, in accordance with the principles of the present invention.

In particular, as shown in FIG. 1 the ALI/ESME Steering Gateway 100 provides a unified interface between each PSAP/ALI in the national PSAP/ALI network, and positioning centers (XPCs) 1-5 in every non-landline network e.g. cellular, VoIP etc.

The inventive ALI/ESME Steering Gateway 100 manages the connectivity between individual PSAP/ALIs 510-515 and XPCs 1-5 (e.g. TCP/IP, frame relay etc). In accordance with the present invention, access by the ALI to the XPC is accomplished with any type of interface, irregardless of the protocol type.

When the PSAP/ALI 510-515 requests location, the ALI/ESME Steering Gateway 100 handles protocol conversions as required between existing and future ALI protocols (ve2, e2, e2+, PAM, legacy NENA, etc.) to the appropriate protocol used to communicate with the XPC that can provide location data.

The ALI/ESME Steering Gateway 100 selects the appropriate XPC for each ALI query it receives, and passes the query; providing protocol translation between the two ALI-XPC interface sets (inbound and outbound) as required.

Preferably, the ALI/ESME Steering Gateway 100 also consolidates (or "de-duplicates") any/all duplicated requests from a same PSAP/ALI for the same emergency call. In this way, only one request is then sent to the destined XPC within the relevant XPC network.

The ALI/ESME steering gateway 100 may also implement an ALI update request throttling as described in U.S. Provisional Patent Application No. 60/700,345, the entirety of which is expressly incorporated herein by reference.

On the 'inbound' ALI-MPC interfaces of the ALI/ESME Steering Gateway 100, shown generally on the left-hand side of FIG. 1, various exemplary interface protocols are shown, e.g. PAM, legacy NENA, NENA ESP, European OMA MLP and the pre-standard VoIP E2. Similarly, 'outbound' ALI-MPC interfaces of the ALI/ESME Steering Gateway 100, may include the same (or different) type interfaces, as shown generally on the right-hand side of FIG. 1.

Upon receipt of a location request from any of the various PSAP/ALIs 510-515, the ALI/ESME Steering Gateway 100 determines the correct XPC 1-5 servicing the call by accessing a suitable location to carrier lookup table 561. Most importantly, in that lookup, the outbound interface protocol type for accessing the relevant XPC 1-5 of the determined carrier's network is determined (e.g., E2, PAM, legacy NENA, NENA ESP or OMA MLP etc).

Because of the flexibility imported by the implementation of an ALI/ESME Steering Gateway 100 in accordance with the principles of the present invention, important network improvements can be accomplished.

For instance, the ALI/ESME Steering Gateway 100 preferably includes the capability to convert a single location request from a PSAP/ALI 510-515 to multiple ALI queries. Thus, the ALI/ESME steering gateway 100 may initiate multiple ALI location request queries to relevant XPCs 1-5 on the 'outbound' ALI interface shown generally on the right side of FIG. 1.

Another important network improvement is that the ALI/ESME steering gateway 100 can provide, as desired, the ability to de-duplicate duplicate location requests for a same emergency call. In this respect, it is possible that multiple location request queries may be received for the position of a same mobile device. In such a case, multiple duplicated ALI queries may be received by the ALI/ESME Steering Gateway 100. Thus, ALI/ESME Steering Gateway 100 may operate in a networked redundant mode that is capable of consolidating multiple identical ALI location requests from the same inbound ALI interface grouping (i.e. to/from the same PSAP). In such case, the ALI/ESME Steering Gateway 100 should exchange information in realtime so that the requesting device (e.g., an ALI) and the receiving device (e.g. an XPC) can coordinate and consolidate any duplicated ALI location requests received independently.

As mentioned previously, a PSAP must be capable of querying a variety of XPC networks that are determined to be responsible for a given emergency caller. The ALI/ESME Steering Gateway 100, using the location to carrier lookup table 561, determines which XPC 1-5 network a received ALI location request should be steered to, removing the burden of this from the PSAP/ALI system 510-515. Thus, the ALI/ESME steering gateway determines whether a consolidated ALI location request query should be steered, and to which XPC 1-5 the query should be steered to.

In one embodiment, this can be accomplished by checking the query key, i.e., the Emergency Service Routing Key (ESRK) or the Emergency Service Routing Digits (ESRD). This query key is compared to a database in the location to carrier lookup table 561 that contains information about which particular carrier owns that particular ESRK and/or ESRD. The carrier is matched to a particular XPC 1-5 for location servicing.

Once the ALI/ESME steering gateway 100 determines where a consolidated ALI location request query should be steered, based on the configuration of the outbound ALI interface, the ALI/ESME Steering Gateway 100 formats the received ALI location request query in the appropriate interface protocol type for the outbound ALI interface. Optionally, the ALI/ESME steering gateway 100 can generate multiple redundant ALI location request queries over the outbound ALI interface.

Figure 2:
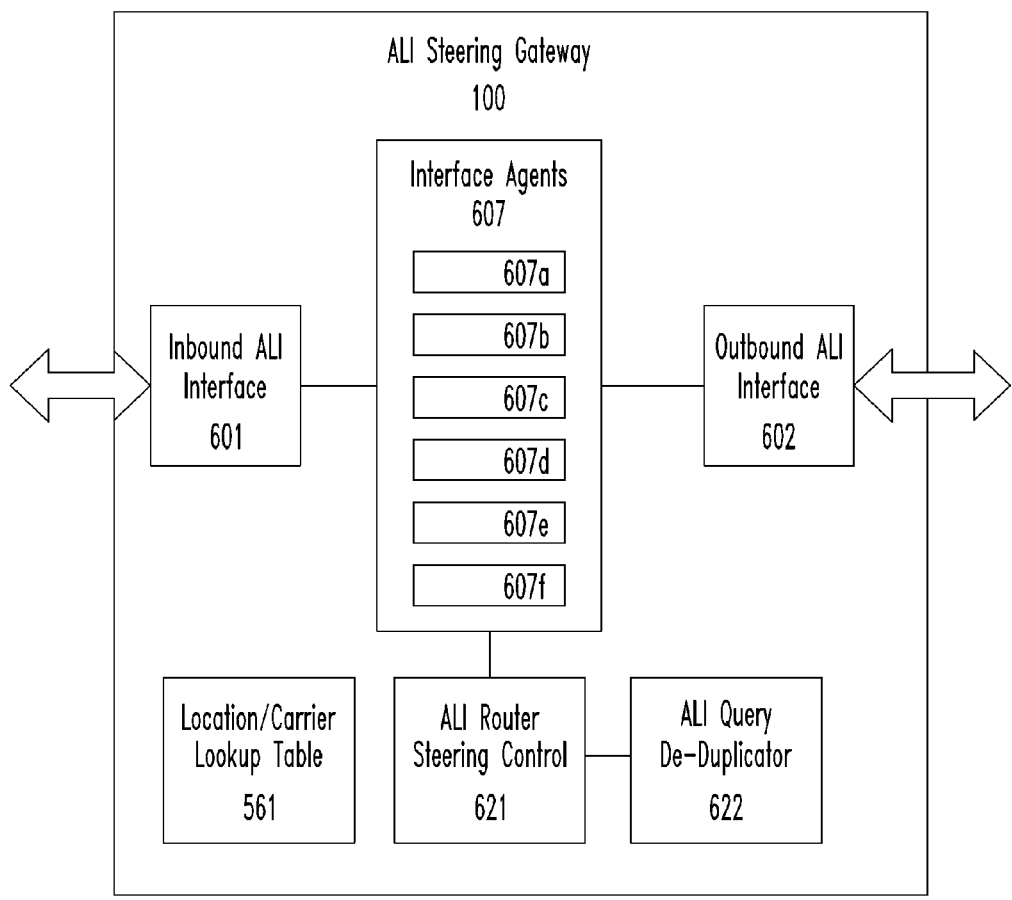
FIG. 2 shows an exemplary ALI/ESME steering gateway, in accordance with the principles of the present invention.

FIG. 2 shows an exemplary ALI/ESME steering gateway, in accordance with the principles of the present invention.

In particular, as shown in FIG. 2, the exemplary ALI/ESME steering gateway 100 comprises an 'inbound' ALI interface protocol 601, and an 'outbound' ALI interface protocol 602. The 'inbound' and 'outbound' interfaces protocols may utilize one of a variety of connection protocols (e.g. TCP/IP, frame relay), and may access the public world wide web (the Internet) and/or a local Intranet.

The ALI/ESME Steering Gateway 100 includes a suitable software agent 607 capable of establishing and maintaining a virtual connection between a given ALI/ESME of the respective protocol type (e.g., E2) with a XPC of the same respective protocol type. Protocol conversion is accomplished in a suitable processor associated with an ALI router steering control 621 having a data bus in communication with each software agent 607a to 607f. The ALI/ESME Steering Gateway 100 further includes an emergency call de-duplicator 622, providing the ability to de-duplicate duplicate location requests for a same emergency call.

During the transaction of steering a given ALI location request query, the ALI/ESME Steering Gateway 100 maintains the connection management for the inbound ALI interface 601 and the outbound ALI interface 602 separately. At the same time, however, the ALI/ESME Steering Gateway 100 coordinates the inbound and outbound ALI interfaces 601, 602, so that when the response(s) to the location request query (or queries) of the outbound ALI interface 602 is received, the ALI/ESME Steering Gateway 100 can translate and format a proper response(s) on the inbound ALI interface 601.

FIGS. 3A through 3B are a table showing possible ALI-MPC interface steering types, in accordance with an exemplary embodiment of the present invention. These interfaces currently exist in the PSAP/ALI network, and are used as examples for steering scenarios.

For example, as shown in FIGS. 3A through 3B, possible steering scenarios include steering ALI location requests from an ALI/ESME utilizing PAM protocols (e.g., PAM v6.1) (row 301) to any type XPC, e.g., XPC using the same PAM interface (column 311), or to an XPC using an SR/ALI E2 type protocol, e.g., NENA 05 redundant note primary/secondary operation as depicted in column 312. Similarly, ALIs using other protocols as depicted in rows 302-306 of FIG. 6 can communicate with XPCs using any protocol as depicted in columns 311-316- or any future protocols, using an ALI/ESME Steering Gateway 100 in accordance with the principles of the present invention.

Figure 4:
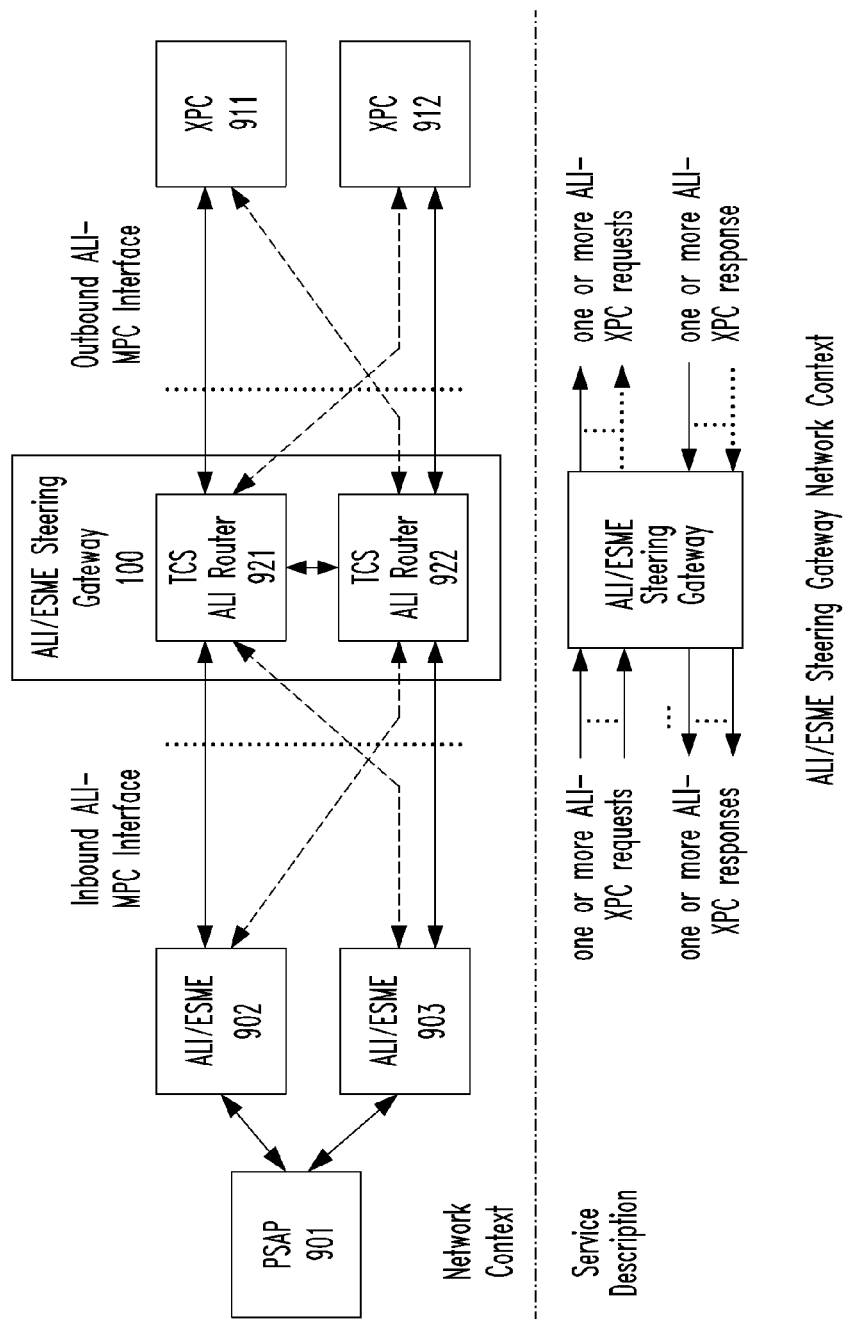
FIG. 4 depicts ALI-XPC interface steering from a network context, in accordance with the principles of the present invention.

FIG. 4 depicts ALI-XPC interface steering from a network context, in accordance with the principles of the present invention.

In particular, as shown in FIG. 4, a PSAP 901 makes an ALI location request of a relevant ALI/ESME 902 or 903. The ALI/ESME communicates with the ALI/ESME Steering Gateway 100, and is routed through relevant ALI router agents 921, 922 to desired XPC 911 or 912 of given XPC networks. The ALI router agents 921, 922 may be associated with any given interface protocol, e.g., E2 and PAM, respectively; or NENA ESP and PAM; etc.

Figure 5A:
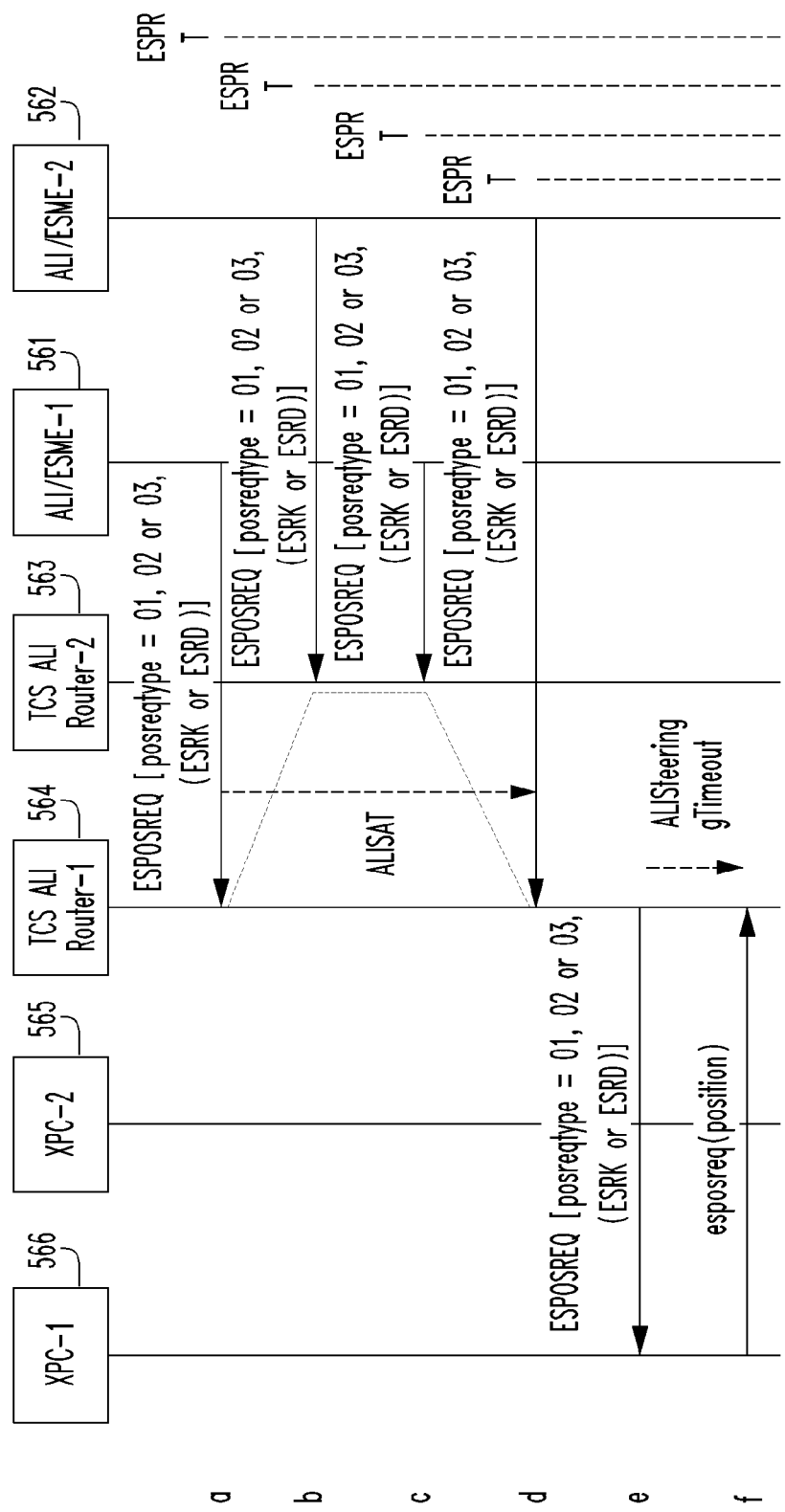
FIGS. 5A through 5B are an exemplary call flow diagram showing a successful E2 ALISA (Fully Connected Redundant Node, Both Mode) to SR/ALI-E2+ Steering, in accordance with the principles of the present invention.
Figure 5B:
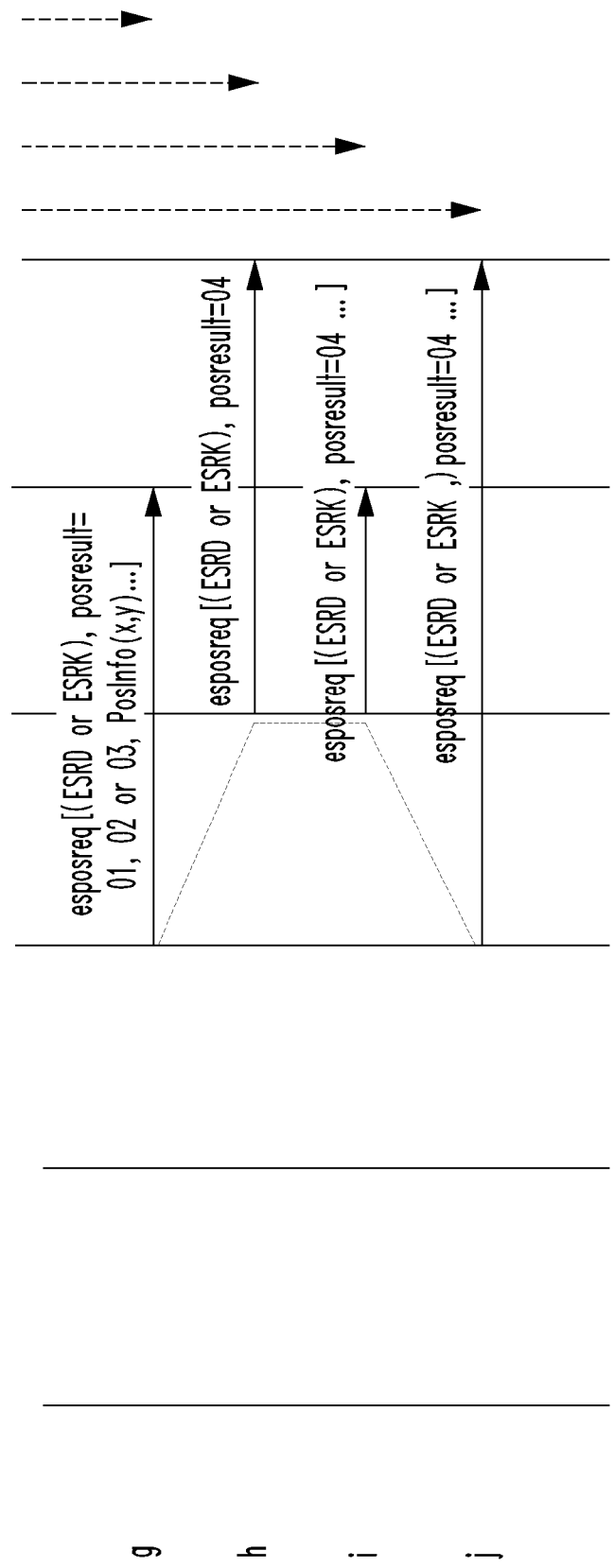
Figure 6:
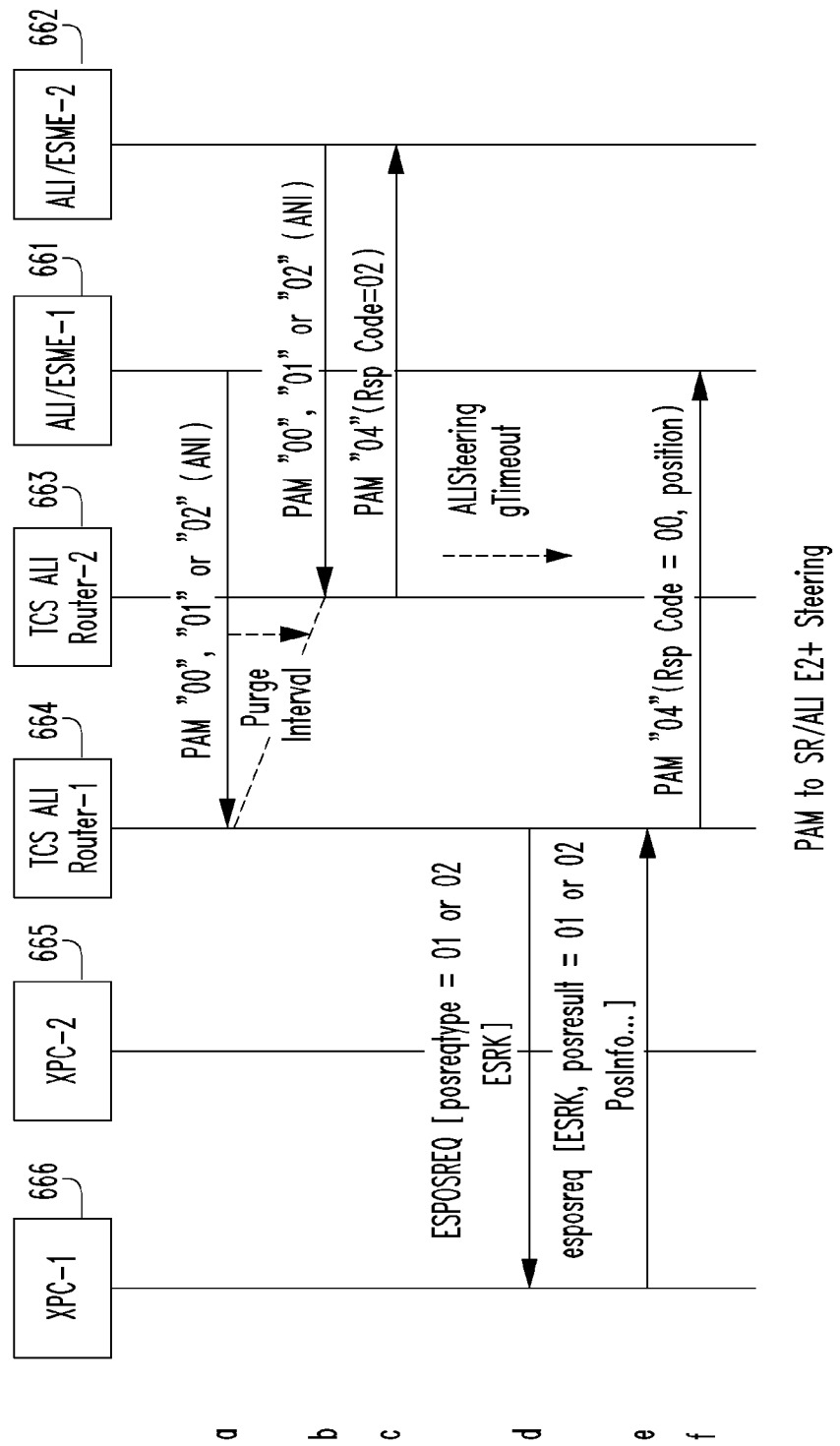
FIG. 6 is an exemplary call flow diagram showing a successful PAM to SR/ALI-E2 Steering, in accordance with the principles of the present invention.
Figure 7:
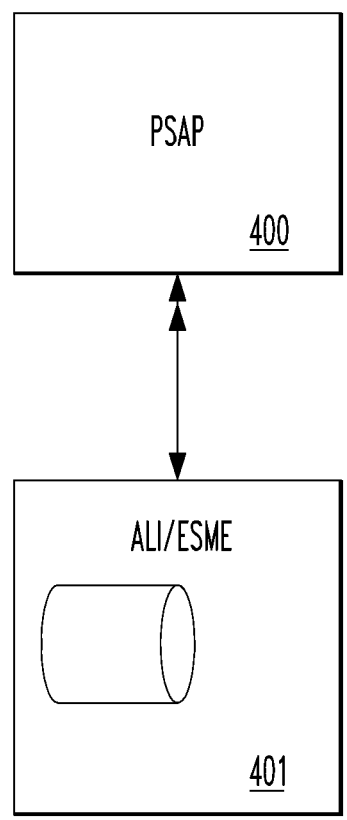
FIG. 7 shows a conventional landline public safety access point (PSAP) to automatic location identifier (ALI) connection.
Figure 8:
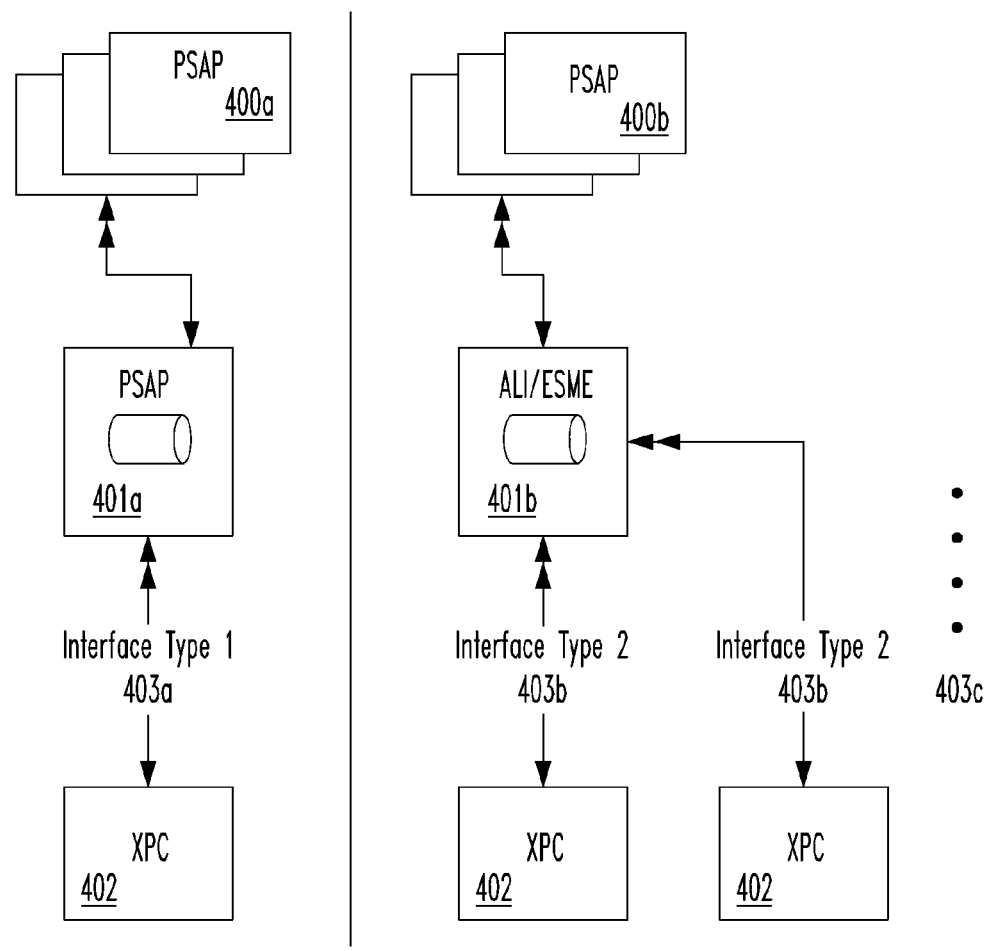
FIG. 8 shows a context diagram for a conventional XPC network (non-landline).

FIGS. 5A through 5B and 6 show message flow for ALI steering between representative protocol types, in accordance with the principles of the present invention. These Figures are intended to illustrate to those of ordinary skill in the art exemplary message flows of the E2 ALISA to SR/ALI-E2 Steering and the PAM to SR/ALI-E2 Steering, as examples of ALI Steering implementation. Of course, as depicted in the table of FIG. 6, many other combinations and conversions of protocols may be implemented with ALI steering in accordance with the principles of the present invention.

FIGS. 5A through 5B are exemplary call flow diagrams showing a successful E2 ALISA (Fully Connected Redundant Node, Both Mode) to SR/ALI-E2+ Steering, in accordance with the principles of the present invention.

In particular, as shown in step (a) of FIGS. 5A-5B, as ALI/ESME-1 561 and ALI/ESME-2 562 are in Both Mode (both ESMEs query each of the MPCs 565, 566 to which each ESME 561, 562 has a TCP/IP session established. ALI/ESME-1 561 queries for position by sending an ESPOSREQ to ALI router agent 1 564 running in the ALI/ESME Steering Gateway 100.

In step (b), ALI/ESME-1 561 sends an identical ESPOSREQ to ALI router agent 2 563 running in the ALI/ESME Steering Gateway 100 for position. Note that this ESPOSREQ has the same transaction ID as the one in the ESPOSREQ received in Step (a).

In step (c), ALI/ESME-2 562 also sends an identical ESPOSREQ to ALI router agent 2 563. Note that the Transaction ID in this ESPOSREQ will be different from the one in steps (a) and (b).

In step (d), ALI/ESME-2 562 sends an identical ESPOSREQ to ALI router agent 1 564. Note that this ESPOSREQ has the same Transaction ID as the one in the ESPOSREQ received in step (c).

In step (e), the ALI/ESME Steering Gateway 100 may start a timer when it first receives an ESPOSREQ message from one of ALISA connections. Any identical E2 ALISAESPOSREQ requests received before the timer expiration shall be considered as duplicated requests; any identical E2 ALISAESPOSREQ requests received after the timer expires shall be considered as a new ALISA transaction. On receiving the identical ESPOSREQs, the ALI router agent 1 564 and the ALI router agent 2 563 shall exchange information, process only the first received ESPOSREQ (or decide which one to process by other manner). In this message flow, the ALI router agent 1 564 handles the request.

Upon receipt of the ESPOSREQ messages, the ALI router agent determines the Query Key (ESRK or ESRD included in the first received query), and is configured to be steered to an outbound SR/ALI E2+grouping. ALI router agent 1 564 and ALI router agent 2 563 are coordinated so that the ALI/ESME Steering Gateway 100 starts an ALI Steering Timeout timer whenever it is ready to generate queries to the outbound SR/ALI E2+ interface. The ESPOSREQ that is being processed is forwarded to the XPC 566 with a new Transaction ID via the primary outbound connection, and an ESPRT timer is started.

In step (f), the XPC-1 566 returns position information in an esposreq message. The ALI/ESME Steering Gateway 100 stops the ALI Steering Timeout timer when it receives the results of the outbound steered ALI transaction.

In step (g), ALI router agent 1 564 returns an esposreq with the requested position information to the ALI/ESME-1 561. The ALI router agents 563, 564 manage the state for each TCP/IP session to ALISA. In the case that the selected session (ESPOSREQ) for response is out of service, the ALI router agents 563, 564 can use a different route from which the ALI router agent 563, 564 has received the same query.

In step (h), ALI router agent 2 563 returns an esposreq with PositionResult=04 (requestedPositionNotAvailable) or other error code, without position info to the ALI/ESME-1 561.

In step (i), ALI router agent 2 563 returns an esposreq with PositionResult=04 (requestedPositionNotAvailable) or other error code, without position info to the ALI/ESME-2 562.

In step j), ALI router agent 1 564 returns an esposreq with PositionResult=04 (requestedPostionNotAvailable) or other error code, without position info to the ALI/ESME-2 562.

FIG. 6 is an exemplary call flow diagram showing a successful PAM to SR/ALI-E2 Steering, in accordance with the principles of the present invention.

In particular, as shown in step (a) of FIG. 6, an ALI/ESME-1 661 queries a relevant ALI router agent 1 664 for position by sending a PAM "00", "01" or "02" request with ANI (ESRK).

In step (b), an ALI/ESME-2 662, which is a mated PAM pair with the ALI/ESME-1 661, sends an identical PAM "00", "01" or "02" request to the connected ALI Router agent 2 663.

In step (c), on receiving the first PAM "00", "01" or "02" query from a mated PAM pair, the ALI/ESME Steering Gateway 100 (geographically redundant ALI router agent 1 and ALI router agent 2 belong to the same ALI/ESME Steering Gateway 100) start a timer. When this timer expires, any newly received PAM query is considered as a new transaction. Within a "Purge Interval" period, an identical PAM "00", "01" or "02" is expected as the first query. The ALI/ESME Steering Gateway 100 coordinates the ALI router agent 1 664 and ALI router agent 2 663. The ALI router agent 2 663 responds to the second PAM "00", "01" or "02" query, which is identical to the first received PAM query, with a PAM "04" message with response code=02 (short response). Note: Two PAM queries are considered to be identical if the following information elements of the two queries are exactly the same: MESSAGE TYPE, PSAPID, ANI, POSITION and TRUNK.

In step (d), based on the first received PAM query, the ALI/ESME Steering Gateway 100 determines if the query needs to be steered, and to which outbound ALI interface it is to be steered based on the included ESRK. In the given exemplary scenario of FIG. 6, the query is steered to an outbound SR/ALI-E2 type interface.

The ALI router agent 1 664 and ALI router agent 2 663 are coordinated, so that the ALI/ESME Steering Gateway starts an ALI Steering Timeout timer whenever the ALI/ESME Steering Gateway 100 is ready to generate queries to an outbound SR/ALI-E2 interface. One ESPOSREQ message is generated, by translating the information received in the PAM query to the corresponding ESPOSREQ information elements. The ALI router agent 1 664 sends an ESPOSREQ and starts an ESPRT timer for the query.

In step (e), a XPC-1 666 sends position information in an esposreq message back to the ALI router agent 1 664. The corresponding ESPRT is stopped. ALI router agent 1 stops the ALI Steering Timeout timer when it receives the result of the outbound steered ALI transaction.

In step (f), upon receiving position information in an esposreq message, the ALI router agent 1 664 translates the received information to the information elements in the PAM "04" message format, and sends it back to the ALI/ESME-1 661.

While the invention has been described with reference to the exemplary embodiments thereof, those skilled in the art will be able to make various modifications to the described embodiments of the invention without departing from the true spirit and scope of the invention.

What is claimed is:

1. An automatic location identification (ALI) steering gateway, comprising:
    a plurality of interface protocol agents for communicating with respective ones of a plurality of ALI systems each having a different one of a plurality of different Internet Protocol (IP) communication protocols for communicating with a respective one of a plurality of mobile positioning centers;
    an inbound ALI interface for connecting each of said plurality of interface protocol agents to said respective one of said plurality of ALI systems; and
    an outbound ALI interface for connecting each of said plurality of interface protocol agents to said plurality of mobile positioning centers.

2. The automatic location identification (ALI) steering gateway according to claim 1, wherein said plurality of different Internet Protocol (IP) communication protocols comprise:
    Pulse Amplitude Modulation (PAM);
    National Emergency Number Association (NENA); and
    E2.

3. The automatic location identification (ALI) steering gateway according to claim 1, wherein said plurality of different Internet Protocol (IP) communication protocols comprise:
    Pulse Amplitude Modulation (PAM); and
    E2.

4. The automatic location identification (ALI) steering gateway according to claim 1, further comprising:
an ALI request de-duplicator to consolidate a plurality of ALI requests received by said ALI steering gateway into a fewer number of ALI requests transmitted by said ALI steering gateway.

5. The automatic location identification (ALI) steering gateway according to claim 1, further comprising:
a carrier lookup table associating each of said plurality of different Internet Protocol (IP) communication protocols with a given one of said plurality of mobile positioning centers.

6. The automatic location identification (ALI) steering gateway according to claim 1, wherein said plurality of different Internet Protocol (IP) communication protocols comprise:
E2.

7. The automatic location identification (ALI) steering gateway according to claim 1, wherein said plurality of different Internet Protocol (IP) communication protocols comprise:
Pulse Amplitude Modulation (PAM).

8. The automatic location identification (ALI) steering gateway according to claim 1, wherein said plurality of different Internet Protocol (IP) communication protocols comprise:
National Emergency Number Association (NENA).

9. The automatic location identification (ALI) steering gateway according to claim 1, wherein:
said ALI steering gateway is comprised in an E911 service provider network.

10. A method of steering automatic location identification (ALI) requests of one type IP protocol to a mobile positioning center of another type IP protocol, comprising:
receiving an ALI request of an inbound ALI interface using a first type Internet Protocol;
converting said ALI request into a second type Internet Protocol different from said first type Internet Protocol; and
transmitting said converted ALI request over an outbound ALI interface using said second type Internet Protocol;
wherein an ALI request of one type Internet Protocol is able to access a mobile positioning center using a different type Internet Protocol.

11. The method of steering automatic location identification (ALI) requests of one type IP protocol to a mobile positioning center of another type IP protocol according to claim 10, wherein:
said received ALI request is sourced from a public safety access point (PSAP).

12. The method of steering automatic location identification (ALI) requests of one type IP protocol to a mobile positioning center of another type IP protocol according to claim 10, further comprising:
upon receipt of said ALI request, determining a wireless carrier servicing a particular location using a location to carrier lookup table.

13. The method of steering automatic location identification (ALI) requests of one type IP protocol to a mobile positioning center of another type IP protocol according to claim 10, further comprising:
upon receipt of said ALI request, determining an interface type of a given mobile positioning center of a wireless carrier servicing a relevant emergency caller.

14. The method of steering automatic location identification (ALI) requests of one type IP protocol to a mobile positioning center of another type IP protocol according to claim 10, further comprising:
multiplying a single ALI request from at least one of an ALI and a public safety access point (PSAP);
wherein an additional ALI request is directed to an additional mobile positioning center.

15. The method of steering automatic location identification (ALI) requests of one type IP protocol to a mobile positioning center of another type IP protocol according to claim 10, further comprising:
de-duplicating a plurality of ALI requests into a fewer number of ALI requests directed to said mobile positioning center.

16. The method of steering automatic location identification (ALI) requests of one type IP protocol to a mobile positioning center of another type IP protocol according to claim 10, wherein said first type Internet Protocol and said second type Internet Protocol each comprise one of:
PAM;
NENA; and
E2.

17. Apparatus for steering automatic location identification (ALI) requests of one type IP protocol to a mobile positioning center of another type IP protocol, comprising:
means for receiving an ALI request of an inbound ALI interface using a first type Internet Protocol;
means for converting said ALI request into a second type Internet Protocol different from said first type Internet Protocol; and
means for transmitting said converted ALI request over an outbound ALI interface using said second type Internet Protocol;
wherein an ALI request of one type Internet Protocol is able to access a mobile positioning center using a different type Internet Protocol.

18. The apparatus for steering automatic location identification (ALI) requests of one type IP protocol to a mobile positioning center of another type IP protocol according to claim 17, wherein:
said received ALI request is sourced from a public safety access point (PSAP).

19. The for steering automatic location identification (ALI) requests of one type IP protocol to a mobile positioning center (MPC) of another type IP protocol according to claim 17, further comprising:
means for determining a wireless carrier servicing a particular location using a location to carrier lookup table, upon receipt of said ALI request.

20. The apparatus for steering automatic location identification (ALI) requests of one type IP protocol to a mobile positioning center (MPC) of another type IP protocol according to claim 17, further comprising:
means for determining an interface type of a given mobile positioning center of a wireless carrier servicing a relevant emergency caller, upon receipt of said ALI request.

21. The apparatus for steering automatic location identification (ALI) requests of one type IP protocol to a mobile positioning center (MPC) of another type IP protocol according to claim 17, further comprising:
means for multiplying a single ALI request from at least one of an ALI and a public safety access point (PSAP);
wherein an additional ALI request is directed to an additional mobile positioning center.

22. The apparatus for steering automatic location identification (ALI) requests of one type IP protocol to a mobile positioning center (MPC) of another type IP protocol according to claim 17, further comprising:
    means for de-duplicating a plurality of ALI requests into a fewer number of ALI requests directed to said mobile positioning center.

23. The apparatus for steering automatic location identification (ALI) requests of one type IP protocol to a mobile positioning center (MPC) of another type IP protocol according to claim 17, wherein said first type Internet Protocol and said second type Internet Protocol each comprise one of:
    Pulse Amplitude Modulation (PAM);
    National Emergency Number Association (NENA); and
    E2.

\* \* \* \* \*